US011709586B2

(12) United States Patent
Wilde et al.

(10) Patent No.: US 11,709,586 B2
(45) Date of Patent: *Jul. 25, 2023

(54) COLLABORATIVE CONTENT RECOMMENDATION PLATFORM

(71) Applicant: Microsoft Technology Licensing, LLC, Redmond, WA (US)

(72) Inventors: Benjamin Gustav Wilde, Quincy, MA (US); Ransom Lloyd Richardson, Acton, MA (US); Aleksandr Polyakov, Cambridge, MA (US); Michael Adam Scarpati, Wellesley, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/949,623

(22) Filed: Sep. 21, 2022

(65) Prior Publication Data

US 2023/0016576 A1   Jan. 19, 2023

Related U.S. Application Data

(63) Continuation of application No. 17/213,706, filed on Mar. 26, 2021, now Pat. No. 11,513,664.

(Continued)

(51) Int. Cl.
*G06F 3/0482* (2013.01)
*G06F 3/0484* (2022.01)
(Continued)

(52) U.S. Cl.
CPC .......... *G06F 3/0484* (2013.01); *G06F 3/0482* (2013.01); *G06F 40/106* (2020.01); *G06N 20/00* (2019.01)

(58) Field of Classification Search
CPC ................................. G06F 3/048–05
See application file for complete search history.

(56) References Cited

U.S. PATENT DOCUMENTS

| 6,845,374 B1 * | 1/2005 | Oliver | G06F 16/24578 |
| | | | 707/999.005 |
| 7,603,626 B2 * | 10/2009 | Williams | G06Q 10/10 |
| | | | 715/201 |

(Continued)

OTHER PUBLICATIONS

"LightGBM", Retrieved from: https://lightgbm.readthedocs.io/en/latest/, Retrieved Date: Jul. 15, 2019, 2 Pages.

(Continued)

*Primary Examiner* — Daniel Rodriguez
(74) *Attorney, Agent, or Firm* — Schwegman Lundberg & Woessner, P.A.

(57) ABSTRACT

A system and method for summarizing suggested content and sharing the summarized suggested content is described. In one aspect, a computer-implemented method includes performing an analysis of text of a document, searching a document library for content elements and documents based on the analysis of the text, identifying candidate documents and candidate content based on the searching, presenting a list of candidate documents or candidate content with the document authoring application, receiving a selection of a candidate document or candidate content from the list in the document authoring application, and providing the selected candidate document to a collaborative content sharing platform, the collaborative content sharing platform configured to generate a graphical user interface that displays a list of shared documents, the shared documents includes candidate documents selected by one or more users of a group of users that share access to the collaborative content sharing platform.

20 Claims, 22 Drawing Sheets

Related U.S. Application Data

(60) Provisional application No. 63/141,833, filed on Jan. 26, 2021.

(51) Int. Cl.
*G06N 20/00* (2019.01)
*G06F 40/106* (2020.01)

(56) References Cited

U.S. PATENT DOCUMENTS

| | | | |
|---|---|---|---|
| 9,501,490 B2 | 11/2016 | Evans et al. | |
| 10,108,615 B2 | 10/2018 | Masson et al. | |
| 10,394,949 B2 | 8/2019 | Chilakamarri et al. | |
| 11,513,664 B2 | 11/2022 | Wilde et al. | |
| 2004/0019846 A1* | 1/2004 | Castellani | G06Q 10/10 715/229 |
| 2005/0144162 A1* | 6/2005 | Liang | G06F 16/338 |
| 2006/0212415 A1* | 9/2006 | Backer | G06F 16/3347 707/E17.08 |
| 2007/0250901 A1* | 10/2007 | McIntire | G11B 27/34 348/E7.071 |
| 2008/0250331 A1* | 10/2008 | Tulshibagwale | G06Q 10/10 715/751 |
| 2010/0094799 A1* | 4/2010 | Ohashi | G06F 16/9535 706/54 |
| 2013/0066673 A1* | 3/2013 | Rose | G06F 3/048 707/E17.055 |
| 2013/0262454 A1* | 10/2013 | Srikrishna | G06F 16/951 707/765 |
| 2013/0262537 A1* | 10/2013 | Srikrishna | G06F 16/93 707/827 |
| 2013/0262593 A1* | 10/2013 | Srikrishna | H04L 51/234 709/206 |
| 2013/0262596 A1* | 10/2013 | Srikrishna | G06F 16/68 707/754 |
| 2013/0339846 A1* | 12/2013 | Buscemi | G06Q 50/18 715/254 |
| 2014/0025669 A1* | 1/2014 | Srikrishna | G06F 16/9535 707/765 |
| 2014/0032541 A1* | 1/2014 | Srikrishna | G06F 16/24578 707/723 |
| 2014/0032542 A1* | 1/2014 | Srikrishna | G06F 16/9032 707/723 |
| 2014/0032545 A1* | 1/2014 | Srikrishna | G06F 16/93 707/729 |
| 2014/0040253 A1* | 2/2014 | Srikrishna | G06F 16/951 707/726 |
| 2014/0040254 A1* | 2/2014 | Srikrishna | G06F 16/9032 707/728 |
| 2014/0081963 A1* | 3/2014 | Srikrishna | G06F 16/93 707/728 |
| 2014/0282921 A1 | 9/2014 | Filman et al. | |
| 2015/0177925 A1* | 6/2015 | Villaron | G06F 3/0482 715/771 |
| 2015/0215371 A1 | 7/2015 | Zamir | |
| 2015/0339310 A1* | 11/2015 | Pursche | G06F 16/93 707/726 |
| 2016/0072772 A1 | 3/2016 | Geigel et al. | |
| 2016/0094499 A1* | 3/2016 | Uraizee | G06F 3/0482 715/752 |
| 2016/0306798 A1* | 10/2016 | Guo | G06F 16/248 |
| 2017/0031575 A1 | 2/2017 | Dotan-Cohen et al. | |
| 2017/0060917 A1* | 3/2017 | Marsh | H04L 65/1069 |
| 2017/0154188 A1 | 6/2017 | Meier et al. | |
| 2017/0220535 A1* | 8/2017 | Olsen | G06F 40/117 |
| 2017/0300535 A1* | 10/2017 | Papineni | G06F 16/9535 |
| 2018/0025084 A1* | 1/2018 | Conlan | G06F 16/24578 707/734 |
| 2018/0137681 A1* | 5/2018 | Chang | G06F 3/0485 |
| 2018/0267950 A1* | 9/2018 | de Mello Brandao | G06F 40/30 |
| 2018/0349517 A1 | 12/2018 | Kleiman-weiner et al. | |
| 2019/0107940 A1 | 4/2019 | Wynne et al. | |
| 2019/0138637 A1 | 5/2019 | Hogan et al. | |
| 2019/0243890 A1 | 8/2019 | Kwatra et al. | |
| 2019/0392049 A1 | 12/2019 | Estes et al. | |
| 2020/0210693 A1* | 7/2020 | Scanlan | G06F 40/169 |
| 2021/0014287 A1* | 1/2021 | Kimball | H04L 65/403 |
| 2021/0026897 A1* | 1/2021 | Rathje | G06F 16/90332 |
| 2021/0117714 A1 | 4/2021 | Yang et al. | |
| 2021/0125108 A1 | 4/2021 | Metzler et al. | |
| 2021/0141847 A1* | 5/2021 | Govind | G06V 30/40 |
| 2021/0211394 A1* | 7/2021 | Hashimoto | H04L 51/046 |

OTHER PUBLICATIONS

"Non Final Office Action Issued in U.S. Appl. No. 16/655,422", dated Sep. 1, 2022, 26 Pages.

"Notice of Allowance Issued in U.S. Appl. No. 16/655,422", dated Jan. 12, 2023, 11 Pages.

Jeannette, Gribble, "Microsoft Word 2013: Inserting File Name, Document Title, Author & Other Property Details into a Document", Retrieved From : https://www.dickinson.edu/download/downloads/id/2532/word_insert_path_doc_property_, Dec. 11, 2013, 2 Pages.

* cited by examiner

… (1)

COLLABORATIVE CONTENT RECOMMENDATION PLATFORM

CROSS-REFERENCE

The present application is a continuation application of U.S. patent application Ser. No. 17/213,706, filed Mar. 26, 2021, which claims priority from U.S. Provisional Patent Application Ser. No. 63/141,833, filed on Jan. 26, 2021, which applications are incorporated herein by reference in their entirety.

BACKGROUND

The subject matter disclosed herein generally relates to a special-purpose machine that generates a centralized graphical user interface of a collaborative board based on user feedback of suggested documents/content that are recommended based on content of a document that is being edited. Specifically, the present disclosure addresses systems and methods for identifying a candidate document relevant to a document present in a document authoring application, receiving a selection of a candidate document by the user, sharing the selected candidate document on a shared collaboration platform, and adjusting the recommended candidate documents based on collaborating user feedback.

A document authoring application (e.g., Microsoft Word™ or any application from Microsoft Office™) is typically used to author a document and provides the user with a list of recent files accessed by the document authoring application. The list of recent files may not be always be relevant to the user. As such, the user may have to manually search through folders to identify content from previously generated documents that may be relevant to the document currently present in the document authoring application.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
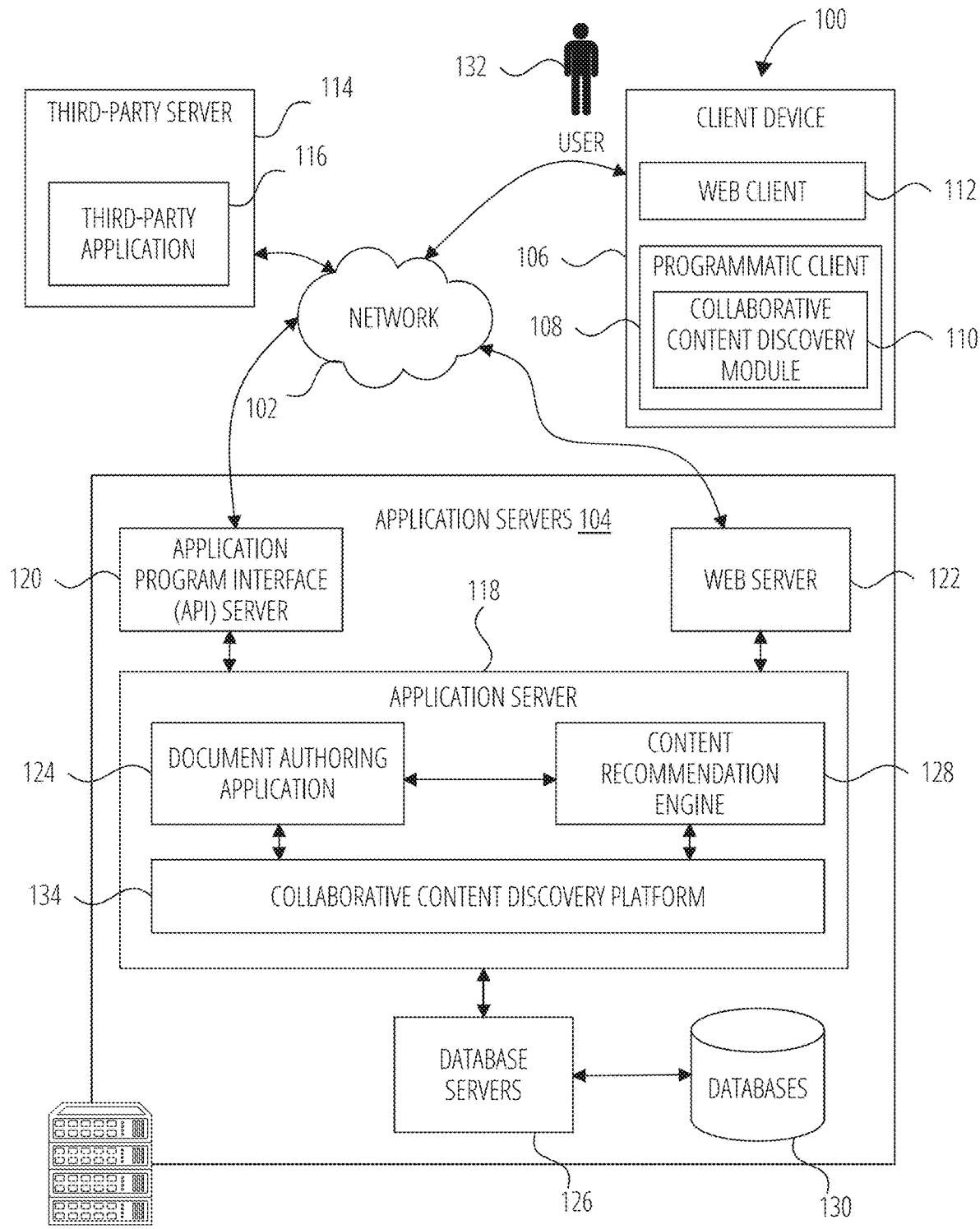
FIG. 1 is a diagrammatic representation of a networked environment in which the present disclosure may be deployed, in accordance with some example embodiments.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

The present application describes a system and method for summarizing suggested real-time dynamic content/documents and sharing the summarized suggested documents/content on a platform (e.g., collaborative content sharing board) with a team of users (e.g., document/content collaborators). One or more users of the team provides suggested content to the platform for feedback. The platform receives feedback from the users and re-arranges the order of the suggested documents, or filters the suggested documents based on the feedback of the users.

In one example, the platform identifies a previously saved documents and content of documents that are pertinent to a user of a document authoring application (e.g., Microsoft Word™, Microsoft PowerPoint™). In one example, the system identifies content (from other documents previously authored, edited, shared by the user, or shared with the user, accessible to the user) with a high likelihood of relevance to the user. The system then presents a list of suggested documents, content from documents/content in a user interface element of the document authoring application. The suggested content is not limited to content from documents. The suggested content can also include any content or data that is pertinent or relevant to the content being edited or authored by the user. Examples of suggested content include, but are not limited to information about related person or resources, information from the web, previous decisions from workflow processes, tasks, whiteboards, extracts from meetings, emails, chat conversations, links to a document, embedded version of a document (or a piece thereof).

In one example embodiment, a content recommendation engine accesses a number of signals to evaluate whether the suggested document is relevant to the platform. For example, the recommendation engine identifies relevant documents/content of documents from a library of documents (e.g., of the same or different types—for example, Word documents, Excel documents, PowerPoint documents) and computes a relevance score for each document/content. Examples of signals include, but are not limited to, metadata of the documents, keywords in the documents, author of the documents, profile of the author of the documents, last accessed time of a document, document creation time, document file size and file type, timestamp a document was shared with the user, whether the document is located in a public or favorite folder, and timestamp of the last access by the user. In another example embodiment, the suggestion system includes a machine learning model based on the above signals to predict relevant documents.

In one example, the user belongs to an enterprise. The enterprise represents an organization or groups of users associated with an organization. The users of the enterprise may make use of enterprise applications operating on client machines. Examples of enterprise applications include chat-based applications, email applications, document authoring applications, document editing applications, document viewing applications, document sharing applications, and other types of applications used by enterprises.

In one aspect, a computer-implemented method includes performing an analysis of text of a document being authored by a user with a document authoring application, searching a document library for content elements and documents based on the analysis of the text, identifying candidate documents and candidate content based on the searching, presenting a list of candidate documents or candidate content with the document authoring application, receiving a selection of a candidate document or candidate content from the list in the document authoring application, and providing the selected candidate document to a collaborative content sharing platform, the collaborative content sharing platform configured to generate a graphical user interface that displays a list of shared documents, the shared documents includes candidate documents selected by one or more users of a group of users that share access to the collaborative content sharing platform.

In one example embodiment, the system presents candidate content that are pertinent to the text of the document being authored by the user. The candidate content includes an instance of the selected candidate document or candidate content in the document.

In one example, the method further comprises: including a reference (or active link) of the selected candidate document. The reference causes a dynamic display of the selected candidate document. The reference or instance of the document may also be referred to as a Fluid Component™, a product of Microsoft Inc. The Fluid Component includes for example, text, tables, charts, and task lists. The Fluid Component can be inserted into emails, documents, and chats. The permissions and access are handled automatically based on access permission to the Fluid Component.

Because Fluid Components are dynamic and stay updated no matter where they are hosted across different service applications (e.g., Microsoft Word, Microsoft Excel, Microsoft PowerPoint), the information stays updated and relevant. But, unlike a document, a Fluid Component is "a little atomic unit of productivity" and fully rendered inline. As such, the user 132 does not need to click on the Fluid Component to open up the corresponding content in another browser tab. The entire Fluid Component is displayed in context in the document authoring application 124 and the user can immediately start editing the Fluid Component. Edits to Fluid Component by several users are synchronized in near real-time across all different service applications used to edit/view the same fluid Component.

As a result, one or more of the methodologies described herein facilitate solving the technical problem of searching for items that a user may not be aware. As such, one or more of the methodologies described herein may obviate a need for certain efforts or computing resources. Examples of such computing resources include processor cycles, network traffic, memory usage, data storage capacity, power consumption, network bandwidth, and cooling capacity.

FIG. 1 is a diagrammatic representation of a network environment 100 in which some example embodiments of the present disclosure may be implemented or deployed. One or more application servers 104 provide server-side functionality via a network 102 to a networked user device, in the form of a client device 106. A user 132 operates the client device 106. The client device 106 includes a web client 112 (e.g., a browser operating a web version of an enterprise application), a programmatic client 108 (e.g., a client-side enterprise document application such as Microsoft PowerPoint™) that is hosted and executed on the client device 106. In one example embodiment, the programmatic client 108 includes a collaborative content discovery module 110 that identifies candidate documents with a high likelihood that the user 132 will incorporate into a document present (e.g., being authored or edited) in the programmatic client 108 (or the web client 112).

For example, the collaborative content discovery module 110 generates a display of a user interface element (e.g., pane pop-up) that includes candidate documents (e.g., recommended or suggested documents, or relevant dynamic real-time content from other documents) in the graphical user interface of the programmatic client 108. The candidate documents may include a set of documents from a library of documents. The library of documents may include documents that have been previously edited, accessed, authored, shared with or by the user 132. The library of documents may be stored in databases 130.

In one example, the collaborative content discovery module 110 detects that the user 132 has started the programmatic client 108. The collaborative content discovery module 110 identifies candidate documents based on a profile of the user 132 (e.g., user 132 is a new accountant), events of the programmatic client 108 (e.g., words/phrases just typed by the user 132), and attributes of documents in the library of documents (e.g., most opened documents from new accounting employees on the first day of their job). The collaborative content discovery module 110 detects a selection of candidate document from the user 132 and shares the selected candidate document on a platform (e.g., collaborative content discovery platform 134) for other users to provide feedback on the selected candidate document. For example, each user of a team having access to the platform can provide feedback on the candidate documents shared by the users of the team. The order of the summarized candidate documents in a list is re-arranged based on the feedback (e.g., up-voting, down-voting) of the users.

In another example embodiment, the collaborative content discovery module 110 detects that the user 132 is writing content for a new document. The collaborative content discovery module 110 identifies the content written by the user 132 in the programmatic client 108. The collaborative content discovery module 110 uses the identified content to identify candidate documents that the user 132 will most likely reuse portions of the content from the candidate documents in the new document. The collaborative content discovery module 110 displays the candidate documents in a new user interface (e.g., new pane) of the programmatic client 108. In another example, the collaborative content discovery module 110 uses the identified content to identify content from candidate documents. The collaborative content discovery module 110 displays the suggested content in the new user interface (e.g., new pane) of the programmatic client 108.

In another example embodiment, the collaborative content discovery module 110 triggers a pane pop-up that includes the candidate documents in response to the user's request to find documents with content relevant to the document currently present in the programmatic client 108. In another example embodiment, the collaborative content discovery module 110 learns from the user's behaviors (with respect to the programmatic client 108) and determines whether to trigger the pane pop-up at the programmatic client 108. For example, the collaborative content discovery module 110 automatically triggers the pane pop-up only on certain keywords, key trigger (e.g., double bracket), or a long-detected pause.

The collaborative content discovery module 110 may operate with the web client 112 and/or the programmatic client 108. In another example embodiment, the collaborative content discovery module 110 is part of the programmatic client 108 or web client 112. For example, the collaborative content discovery module 110 may operate as an extension or add on to the web client 112.

An Application Program Interface (API) server 120 and a web server 122 provide respective programmatic and web interfaces to application servers 104. A specific application server 118 hosts a document authoring application 124, a content recommendation engine 128, and a collaborative content discovery platform 134. The document authoring application 124, content recommendation engine 128, and collaborative content discovery platform 134 include components, modules and/or applications.

The document authoring application 124 includes a content creation application (e.g., Microsoft PowerPoint™, Microsoft Word™) that enables the user 132 to form content such as a presentation document, or a text document. In another example, the document authoring application 124 also includes a collaborative application that enables peer enterprise users to collaborate on a shared document. For example, the client device 106 accesses the document authoring application 124 to view and edit a document that is shared with other peer users. Other examples of document authoring application 124 includes enterprise systems, content management systems, and knowledge management systems. The document authoring application 124 communicates with the programmatic client 108 on the client device 106. For example, the programmatic client 108 checks in with the document authoring application 124 and verifies a validity of a license or version of the programmatic client 108 on the client device 106. In another example embodiment, the programmatic client 108 includes at least one of a content creation application, a collaborative application, and a shared storage application.

In one example embodiment, the content recommendation engine 128 communicates with the document authoring application 124 (or the collaborative content discovery module 110) to identify candidate documents based on a machine learning model that uses the content provided by the user 132 in the programmatic client 108 (or in the web client 112, or document authoring application 124) and other signals such as copy and paste activities of the programmatic client 108, profile of the user 132, attributes of the document currently edited in the programmatic client 108, features of documents in a library of documents previously authored, shared, edited by the user 132, or share with the user 132). The content recommendation engine 128 communicates with the collaborative content discovery module 110 supported by the web server 122 to provide the candidate documents to the programmatic client 108. In another example, the collaborative content discovery module 110 includes functionalities of the content recommendation engine 128. In another example, the collaborative content discovery module 110 includes components of the content recommendation engine 128.

In one example embodiment, the collaborative content discovery platform 134 enables users of a team to share suggested documents (as recommended by the content recommendation engine 128). The collaborative content discovery platform 134 generates a graphical user interface that categorizes and lists the suggested documents. The collaborative content discovery platform 134 updates an order of the lists of suggested documents based on the feedback from users of the teams.

In one example embodiment, the web client 112 communicates with the content recommendation engine 128, the document authoring application 124, the collaborative content discovery platform 134 via the programmatic interface provided by the Application Program Interface (API) server 120. In another example embodiment, the content recommendation engine 128 sends the candidate documents to the collaborative content discovery platform 134. The collaborative content discovery platform 134 causes a display of the selected candidate documents in a pane pop-up based on current activities of the user 132 and other users of the team.

In one example embodiment, the content recommendation engine 128 trains a machine learning model based on application events (e.g., activities of the user 132 on the client device 106 or the document authoring application 124) and features of documents from the library of documents. The content recommendation engine 128 uses a machine learning model to determine whether a document from the library of documents is relevant and includes content that is likely to be reused by the user 132. The content recommendation engine 128 identifies a set of candidate documents and causes the collaborative content discovery module 110 (or the programmatic client 108 or the web client 112) to display a pane pop-up at the programmatic client 108 or the web client 112.

The application server 118 is shown to be communicatively coupled to database servers 126 that facilitates access to an information storage repository or databases 130. In an example embodiment, the databases 130 includes storage devices that store information to be published and/or processed by the document authoring application 124. For example, the databases 130 include a library of documents (e.g., documents that are shared with the user 132, shared by the user 132, accessed, authored, or edited by the user 132 using the web client 112 or the programmatic client 108).

Additionally, a third-party application 116 executing on a third-party server 114, is shown as having programmatic access to the application server 118 via the programmatic interface provided by the Application Program Interface (API) server 120. For example, the third-party application 116, using information retrieved from the application server 118, may supports one or more features or functions on a website hosted by the third party. For example, the third-party application 116 identifies activities of the user 132 on the programmatic client 108. The third-party application 116 provides the activities to the content recommendation engine 128. The content recommendation engine 128 identifies candidate documents pertinent to the user 132 based on the activities of the user 132.

Figure 2:
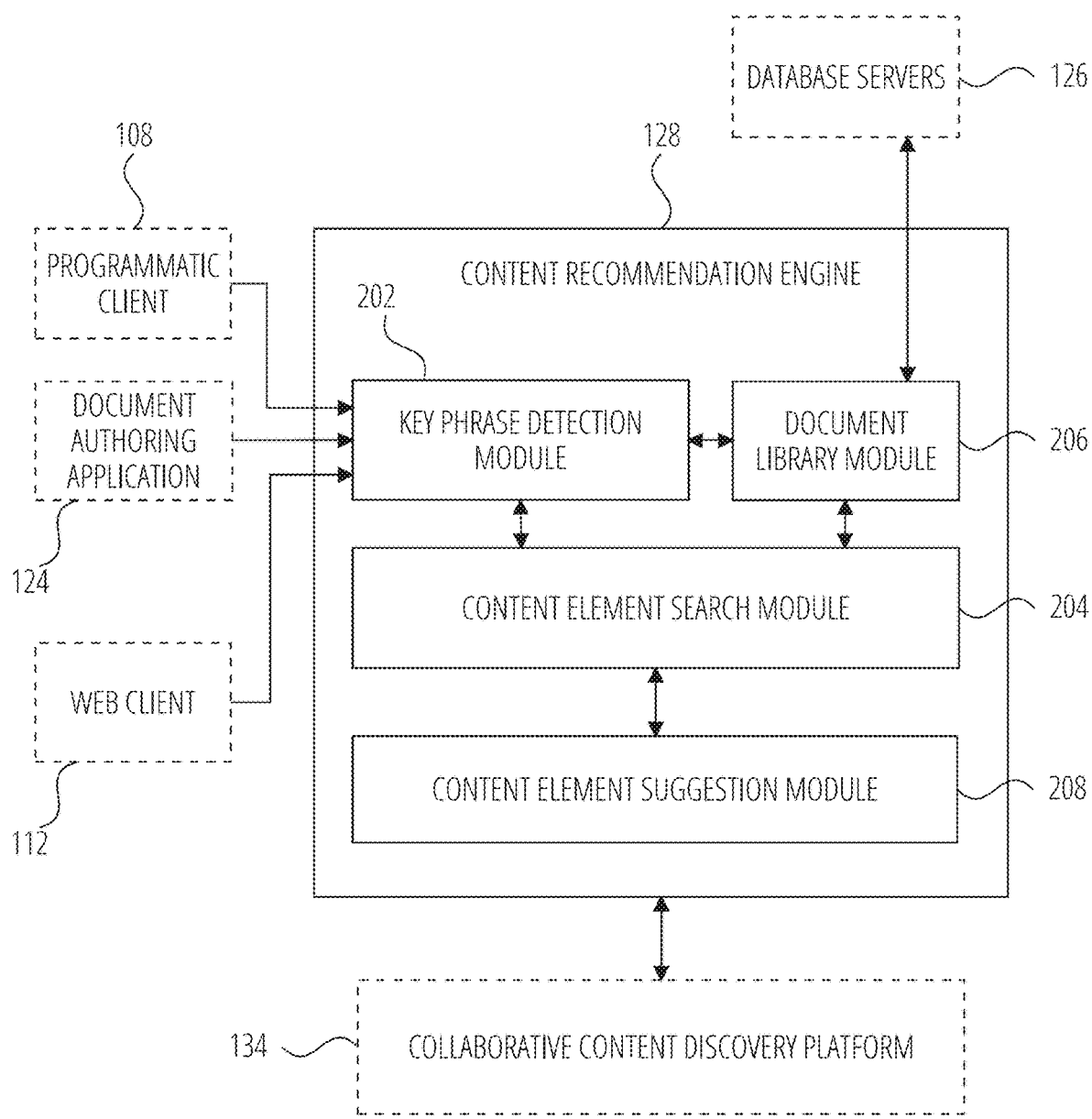
FIG. 2 is a block diagram illustrating a content recommendation engine in accordance with one example embodiment.

FIG. 2 is a block diagram illustrating a content recommendation engine 128 in accordance with one example embodiment. The key phrase detection module 202 accesses user activities data from at least one of the programmatic client 108, the document authoring application 124, and the web client 112.

In example, the key phrase detection module 202 identifies the last several words/phrases written by the user 132 of the document authoring application 124. For example, the key phrase detection module 202 detects the last words of a sentence typed by the user 132. In one example, the key phrase detection module 202 uses machine learning to identify relevant keywords or key terms.

In another example, the key phrase detection module 202 combines user activities data from a combination of the programmatic client 108, the document authoring application 124, and the web client 112. In one example embodiment, the user activities data include user application activities within the programmatic client 108, the document authoring application 124, and the web client 112. For example, the user activities data include copy and paste activities (e.g., which previous document was used to copy in a present document, which part of the previous document was copied), file activities (e.g., which files were last opened by the user 132, which files were recently updated from a group folder shared with the user 132), the type of content (e.g., a PowerPoint slide) being created by the user 132, which features of the document authoring application 124, programmatic client 108, and web client 112 are being used by the user 132, and other user activities related to the document authoring application 124, the programmatic client 108, and the web client 112. The key phrase detection module 202 provides the user activities data to the content element search module 204.

In another example, the key phrase detection module 202 identifies a user profile of the user 132 (e.g., user 132 is a new employee, is part of the accounting department group, and has used the programmatic client 108 less than five times). The key phrase detection module 202 provides the user profile to the content element search module 204.

The document library module 206 accesses a library of documents (that can be accessed with the programmatic client 108) stored in the databases 130. In one example, the library of documents includes different types of documents (e.g., Word documents or PowerPoint documents). The library of documents includes documents shared by the user 132 and documents shared with the user 132. In another example, the library includes documents that the user 132 has or has not previously viewed, edited, or authored. In another example, the library of documents includes documents created by any employee of an enterprise associated with the user 132. In another example, the library of documents includes any documents publicly or privately accessible by the user 132. The document library module 206 accesses the documents and the corresponding attributes (e.g., metadata) of the documents from the library of documents in databases 130, from another storage server, or from another computing device. The document library module 206 provides the documents and corresponding attributes to the content element search module 204.

The content element search module 204 operates using pattern detection algorithms and trained Machine Learning (ML) models to identify relevant documents (e.g., documents that the user 132 is likely to include—copy and paste content). For example, the content element search module 204 trains a machine learning model based on the signals from the key phrase detection module 202 and the document library module 206 to determine whether a document is likely to be pertinent/relevant to the user 132. In one example embodiments, the content element search module 204 analyzes events in the document authoring application 124 or programmatic client 108 to identify trends (e.g., a user has frequently chosen a particular document in the past). The content element search module 204 accesses the above signals from key phrase detection module 202 and the document library module 206. Using the information from the signals, the content element search module 204 can identify trends. Based on the machine learning model, the content element search module 204 can, in one embodiment, suggest candidate documents. The content element search module 204 provides the set of candidate documents to the content element suggestion module 208.

The content element suggestion module 208 communicates the candidate documents to the collaborative content discovery platform 134. In one example embodiment, the content element suggestion module 208 generates a display of the set of candidate documents in a user interface (e.g., a pane) of the programmatic client 108. In another example embodiment, the content element suggestion module 208 identifies content (that the user 132 is likely to copy and paste) from the set of candidate documents in the user interface.

In another example embodiment, the key phrase detection module 202 detects a request to identify relevant documents from the programmatic client 108. In response to the request, the content element search module 204 identifies the set of candidate documents that are provided to the content element suggestion module 208.

Figure 3:
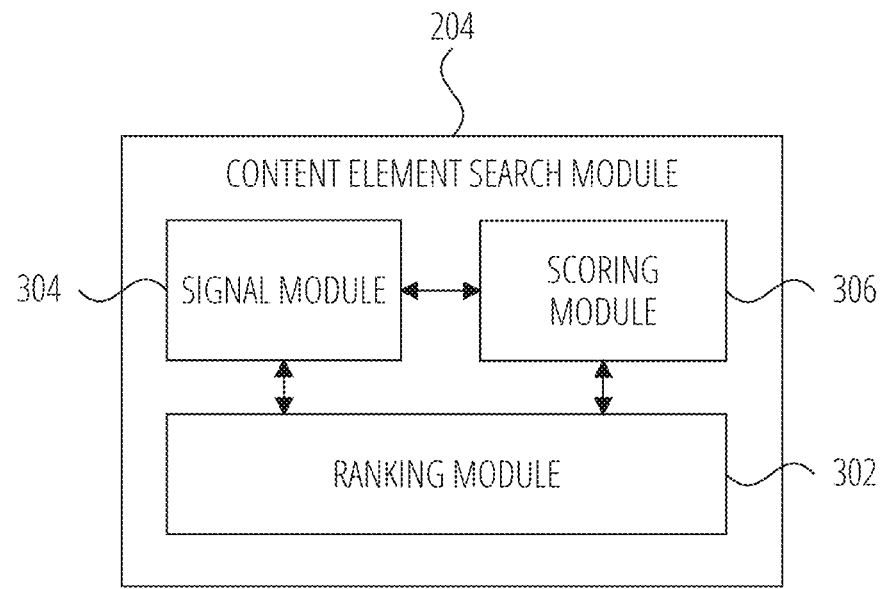
FIG. 3 is a block diagram illustrating a content element search module in accordance with one example embodiment.

FIG. 3 is a block diagram illustrating a content element search module 204 in accordance with one example embodiment. The content element search module 204 includes a signal module 304, a scoring module 306, and a ranking module 302.

In one example embodiment, the signal module 304 accesses signals from the document authoring application 124. Example of signals include, but are not limited to: user activities history, document context, format of the document, expertise or profile of the user, project identification, key words, key phrases in the document. The signals may be obtained as the user 132 types.

The scoring module 306 computes a relevance score for each document based on a trained machine learning model. The relevance score indicates a likelihood that the user 132 will re-use a content from a library of documents into a document present in the programmatic client 108. In one example embodiment, the signal module 304 trains the machine learning model based on a document selected by the user 132 from a list of candidate documents.

The machine learning model of the signal module 304 is trained by data from key phrase detection module 202 and document library module 206. For example, the data includes labeled data (e.g., for each document, did the user select it?), input features for each document at the time it was shown to the user 132 (e.g., examples of input features are listed below), document groups (e.g., during a search, the user 132 is shown a list of documents, from which the user 132 selected one (or more); documents above the clicked document form the group; a ranking model is trained by adjusting the ranking until selected documents appear higher than non-selected docs in a test or cross-validation set).

The scoring module 306 uses a machine learning algorithm to train a machine learning model and compute the relevance score. The scoring module 306 uses, for example, the following feature inputs to the algorithm: for the document, keywords, key phrases, the filename, title, and the 200-character neighborhood around an insertion point; For each candidate document, the filename, title, and summary are used as the input 'content'.

Once the scoring module 306 computes the relevance score for each candidate document (e.g., top 5 documents), the ranking module 302 ranks the candidate documents by relevance score. In one example, the ranking module 302 identifies a set of candidate documents with top relevance scores (e.g., top 5 documents).

The ranking module 302 ranks the candidate documents from the library of documents based on their corresponding relevance score and identifies a top predefined number of documents (e.g., top 5 documents for each type of document, top 5 most relevant sections/content).

Figure 4:
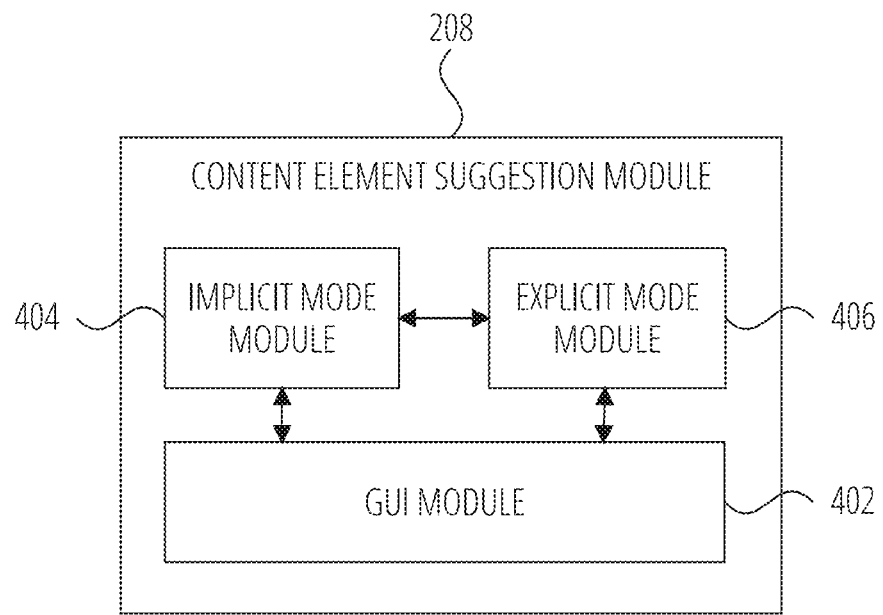
FIG. 4 is a block diagram illustrating a content element suggestion module in accordance with one example embodiment.

FIG. 4 is a block diagram illustrating a content element suggestion module 208 in accordance with one example embodiment. The content element suggestion module 208 includes an implicit mode module 404, an explicit mode module 406, and a GUI module 402.

The implicit mode module 404 surfaces suggestions, where, depending on the current context and what the user 132 is doing. The suggestion identifies and suggests content that might be helpful to the user 132.

For example, as the user 132 is typing in the document authoring application 124, a subtle lightbulb appears on the right side of the GUI. The user 132 can click on the lightbulb, at which point, the implicit mode module 404 underlines the key phrases in the document, while showing a set of related links or knowledge that relates to what the user 132 is working on. The user can choose to pull those links directly into the content he/she is creating, at which point, it appears inline.

Other alternative embodiments include:
determining a high confidence of a suggested document and displaying the suggested document in a margin of the document.
generating a configurable "card" experience based on the suggested document/content; the card may display a hyperlink to the suggested document with a preview of the specific content when the user hovers his/her pointer over the hyperlink.
exposing supplemental information such as related people, other dynamic Components (e.g., also referred to as fluid documents), sub-pieces of documents (e.g., slides or charts), knowledge topics from search, or any number of other entities.
leveraging contextual signals to improve for relevant documents/content: examples of contextual clues include identifying what project a document is associated with, identifying other users working on the same document, headings or metadata in the document.

In one example embodiment, the content recommendation engine 128 actively monitors the content the user 132 is typing in a dynamic document canvas. The content recommendation engine 128 sends detected text to an application service (e.g., Azure Cognitive Services text analytics) using corresponding APIs, where the application service identifies key words or phrases in the text the user 132 is typing. The content recommendation engine 128 then forwards a set of phrases to a search service that returns a set of results.

In the implicit mode, the implicit mode module 404 surfaces suggestions as the user 132 types.

In the explicit mode, the explicit mode module 406 waits for the user 132 to explicitly express an intent to trigger a search, then to display suggestions. For example, the explicit mode module 406 detects that a user types two consecutive bracket character. The explicit mode module 406 uses that as a trigger to bring up a related knowledge picking experience. As the user 132 types more characters after the brackets, the results in the picking experience are refined. If one of the results is picked, the explicit mode module 406 displays a link to the content that was added.

The following illustrates further alternative embodiments:
improving the relevance of the default set of suggestions based on the context and what can be inferred about user intent.
communicating with external services (outside the document authoring application 124) in the suggestions.
underlining parts of the document (being edited) that generate higher-confidence AI-driven suggestions for related content, without needing to activate a GUI element (e.g., lightbulb) or other indicator (e.g., "yellow squiggles") in the margin of the document.
differentiating between collaborators behaving as "authors" (someone actively editing a portion of the document) and "viewers," and either only showing intelligence knowledge recommendations to those in the author context or fading them away after a certain amount of time/"distance" from the authorship activity.
exposing document and other intelligent suggestions through a "+" Component addition menu (e.g., GUI element used to add a table, list, paragraph or other "core" (but blank) document elements).
exposing these suggestions in contextual menus for already-authored content (e.g., alongside the entry point for adding a link).
exposing not only existing documents as suggestions, but the suggestion to create a document when that intent is observed (e.g., "create a PowerPoint for our demo" is linked by the AI to trigger creation of a new .pptx in an appropriate location).

Figure 5:
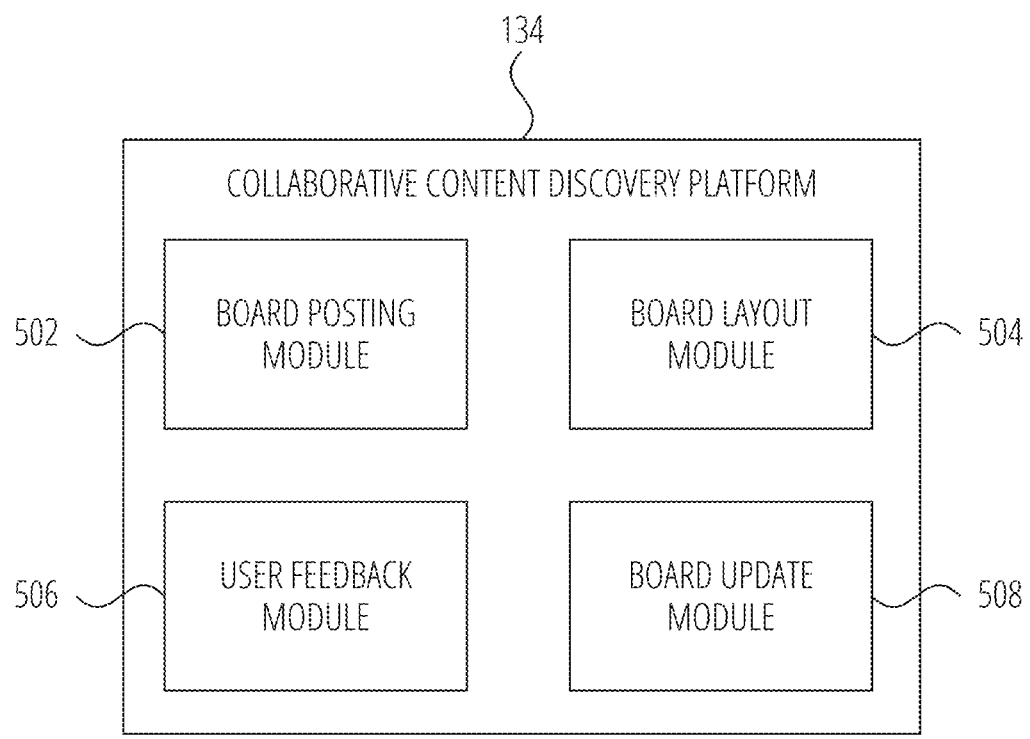
FIG. 5 is a block diagram illustrating a collaborative content discovery platform in accordance with one example embodiment.

FIG. 5 is a block diagram illustrating a collaborative content discovery platform 134 in accordance with one example embodiment. The collaborative content discovery platform 134 includes a board posting module 502, a board layout module 504, a user feedback module 506, and a board update module 508.

The board posting module 502 generates a graphical user interface that illustrates a virtual board where users of a team can post dynamic content/document. The board layout module 504 organizes a layout of the board (e.g., organized by contributing users or topic). The user feedback module 506 generates a graphical user interface control element that enables users of the collaborative content discovery platform 134 to vote up or down a relevancy of a dynamic content element within a topic. The board update module 508 collects the cumulative votes or feedback of the users and reorders an arrangement of the list of content in the virtual board.

Figure 6:
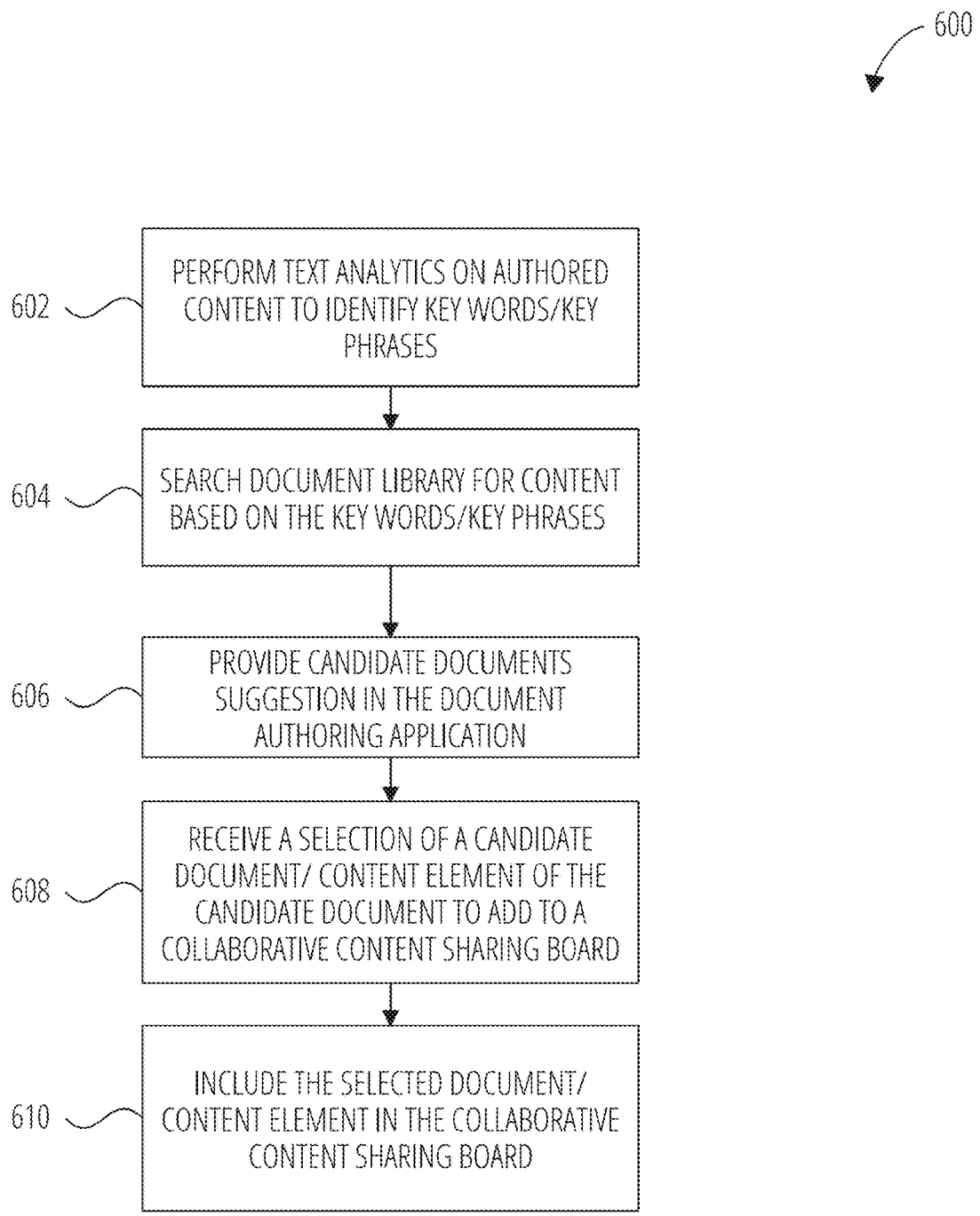
FIG. 6 is a flow diagram illustrating a method for adding suggested content to a collaborative content sharing board in accordance with one example embodiment.

FIG. 6 is a flow diagram illustrating a method for suggesting content in accordance with one example embodiment. Operations in the method 600 may be performed by the content recommendation engine 128, using components (e.g., modules, engines) described above with respect to FIG. 2. Accordingly, the method 600 is described by way of example with reference to the content recommendation engine 128. However, it shall be appreciated that at least some of the operations of the method 600 may be deployed on various other hardware configurations or be performed by similar components residing elsewhere. For example, some of the operations may be performed at the collaborative content discovery module 110.

In block 602, the content recommendation engine 128 performs text analytics on authored content to identify key words/key phrases. In block 604, the content recommendation engine 128 searches document library for content based on the key words/key phrases. In block 606, the content recommendation engine 128 provides candidate documents suggestion in the document authoring application. In block 608, the content recommendation engine 128 receives a selection of a candidate document/content element of the candidate document to add to a collaborative content sharing board. In block 610, the content recommendation engine 128 includes the selected document/content element in the collaborative content sharing board.

Figure 7:
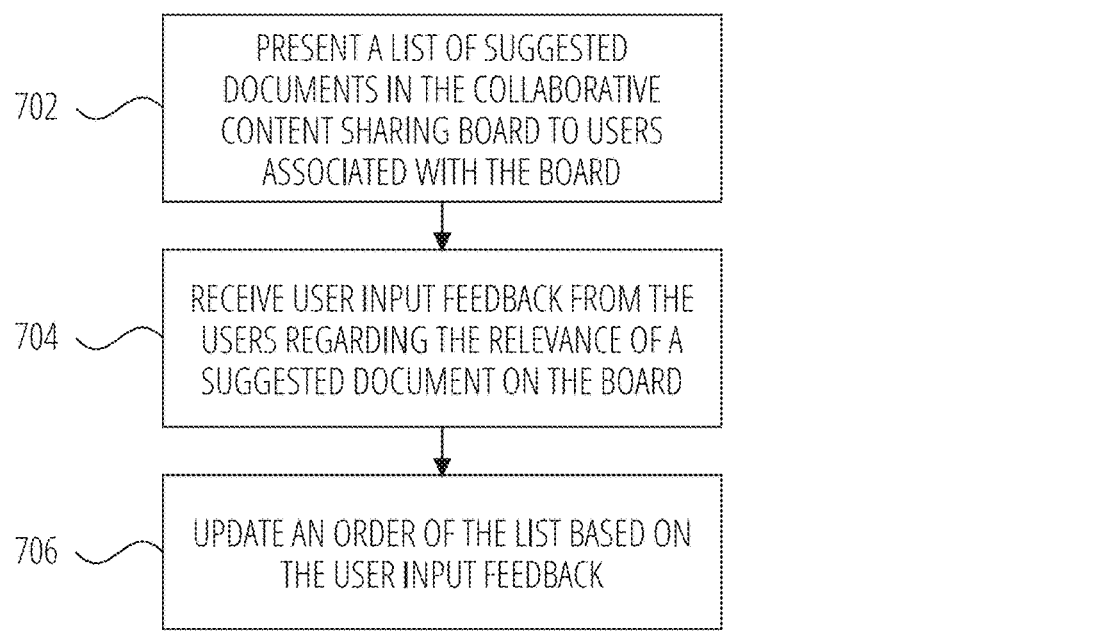
FIG. 7 is a flow diagram illustrating a method for updating an order of suggested content in a list in accordance with one example embodiment.

FIG. 7 is a flow diagram illustrating a method for suggesting content in accordance with one example embodiment. Operations in the method 700 may be performed by the collaborative content discovery platform 134, using components (e.g., modules, engines) described above with respect to FIG. 2. Accordingly, the method 700 is described by way of example with reference to the collaborative content discovery platform 134. However, it shall be appreciated that at least some of the operations of the method 700 may be deployed on various other hardware configurations or be performed by similar components residing elsewhere. For example, some of the operations may be performed at the content recommendation engine 128.

In block 702, the collaborative content discovery platform 134 presents a list of suggested documents in the collaborative content sharing board to users associated with the board. In block 704, the collaborative content discovery platform 134 receives user input feedback from the users regarding the relevance of a suggested document on the board. In block 706, the collaborative content discovery platform 134 updates an order of the list based on the user input feedback.

Figure 8:
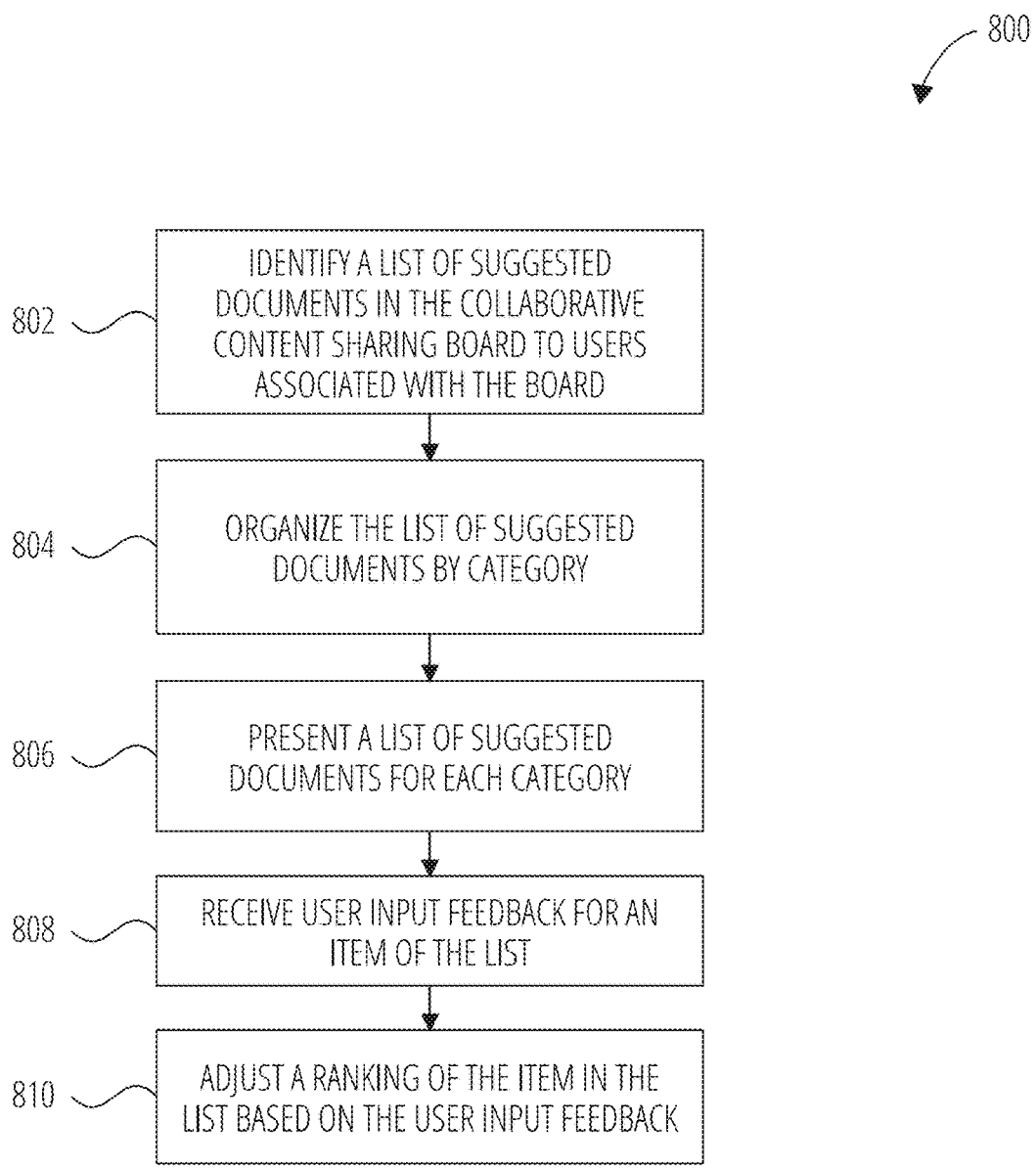
FIG. 8 is a flow diagram illustrating a method for updating an order of suggested content in a list in accordance with one example embodiment.

FIG. 8 is a flow diagram illustrating a method for suggesting content in accordance with one example embodiment. Operations in the method 800 may be performed by the collaborative content discovery platform 134, using components (e.g., modules, engines) described above with respect to FIG. 2. Accordingly, the method 800 is described by way of example with reference to the collaborative content discovery platform 134. However, it shall be appreciated that at least some of the operations of the method 800 may be deployed on various other hardware configurations or be performed by similar components residing elsewhere. For example, some of the operations may be performed at the content recommendation engine 128.

In block 802, the collaborative content discovery platform 134 identifies a list of suggested documents in the collaborative content sharing board to users associated with the board. In block 804, the collaborative content discovery platform 134 organizes the list of suggested documents by category (e.g., a topic, user posting the suggested content on the board, text keywords). In block 806, the collaborative content discovery platform 134 presents a list of suggested documents. In block 808, the collaborative content discovery platform 134 receives user input feedback for an item of the list. In block 810, the collaborative content discovery platform 134 adjusts a ranking of the item in the list based on the user input feedback.

Figure 9:
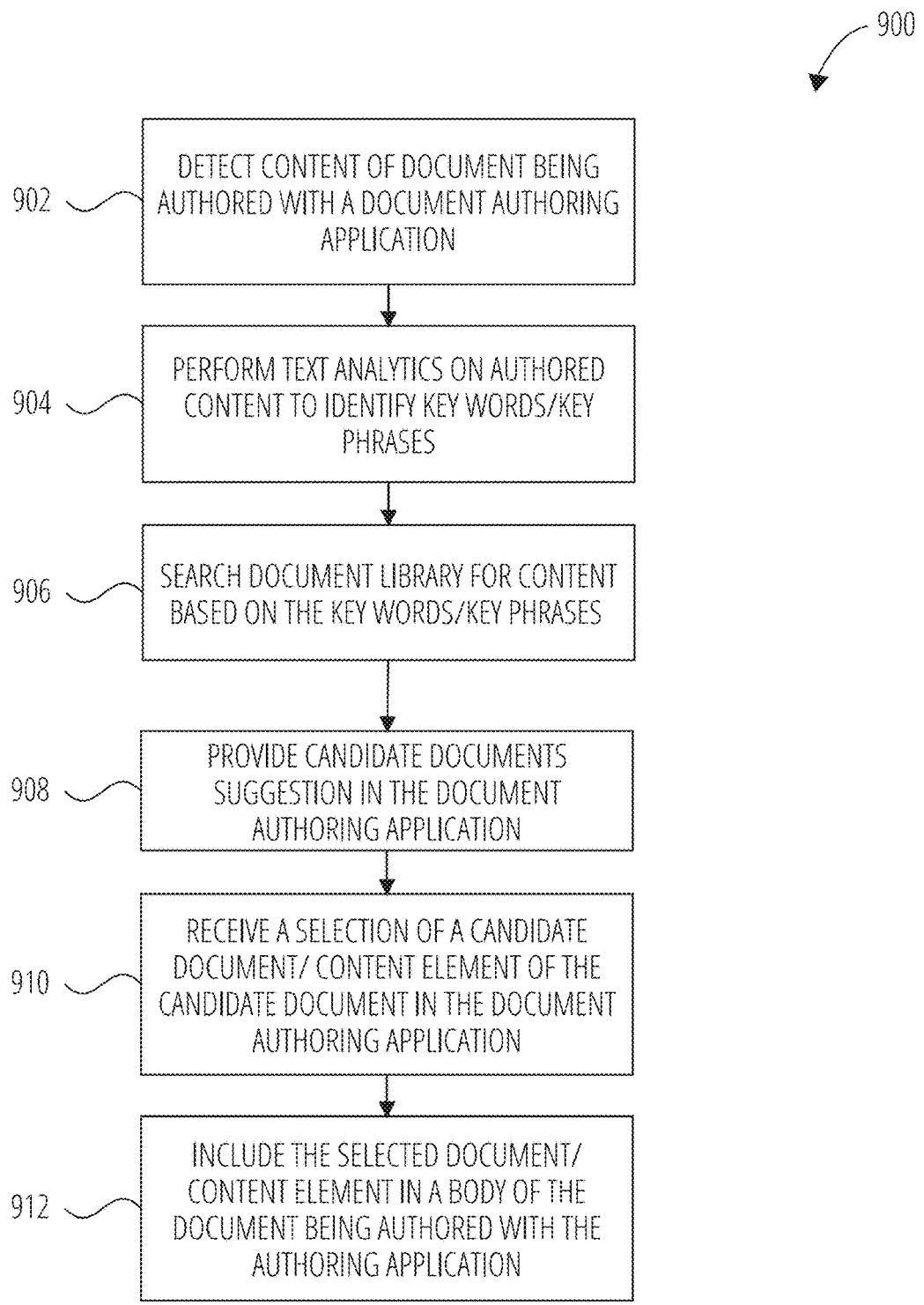
FIG. 9 is a flow diagram illustrating a method for suggesting content in accordance with one example embodiment.

FIG. 9 is a flow diagram illustrating a method for suggesting content in accordance with one example embodiment. Operations in the method 900 may be performed by the content recommendation engine 128, using components (e.g., modules, engines) described above with respect to FIG. 2. Accordingly, the method 900 is described by way of example with reference to the content recommendation engine 128. However, it shall be appreciated that at least some of the operations of the method 900 may be deployed on various other hardware configurations or be performed by similar components residing elsewhere. For example, some of the operations may be performed at the collaborative content discovery module 110.

In block 902, the content recommendation engine 128 detects content of document being authored with a document authoring application. In block 904, the content recommendation engine 128 performs text analytics on authored content to identify key words/key phrases. In block 906, the content recommendation engine 128 searches document library for content based on the key words/key phrases. In block 908, the content recommendation engine 128 provides candidate documents suggestion in the document authoring application. In block 910, the content recommendation engine 128 receives a selection of a candidate document/content element of the candidate document in the document authoring application. In block 912, the content recommendation engine 128 includes the selected document/content element in a body of the document being authored with the authoring application.

Figure 10:
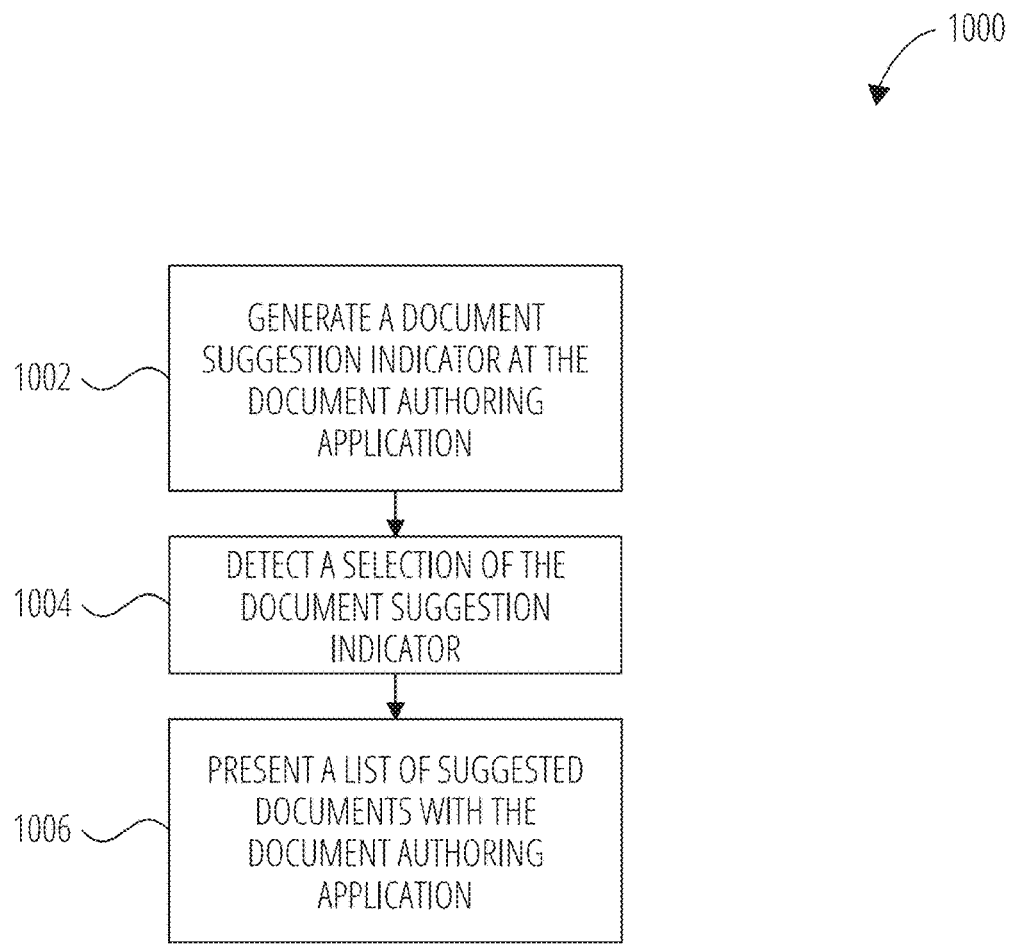
FIG. 10 is a flow diagram illustrating a method for generating a document suggestion indicator in accordance with one example embodiment.

FIG. 10 is a flow diagram illustrating a method 1000 for generating a document suggestion indicator in accordance with one example embodiment. Operations in the method 1000 may be performed by the content recommendation engine 128, using components (e.g., modules, engines) described above with respect to FIG. 2. Accordingly, the method 1000 is described by way of example with reference to the content recommendation engine 128. However, it shall be appreciated that at least some of the operations of the method 1000 may be deployed on various other hardware configurations or be performed by similar components residing elsewhere. For example, some of the operations may be performed at the collaborative content discovery module 110.

In block 1002, the content recommendation engine 128 generates a document suggestion indicator at the document authoring application 124. In block 1004, the content recommendation engine 128 detects a selection of the document suggestion indicator. In block 1006, the content recommendation engine 128 presents a list of suggested documents with the document authoring application.

Figure 11:
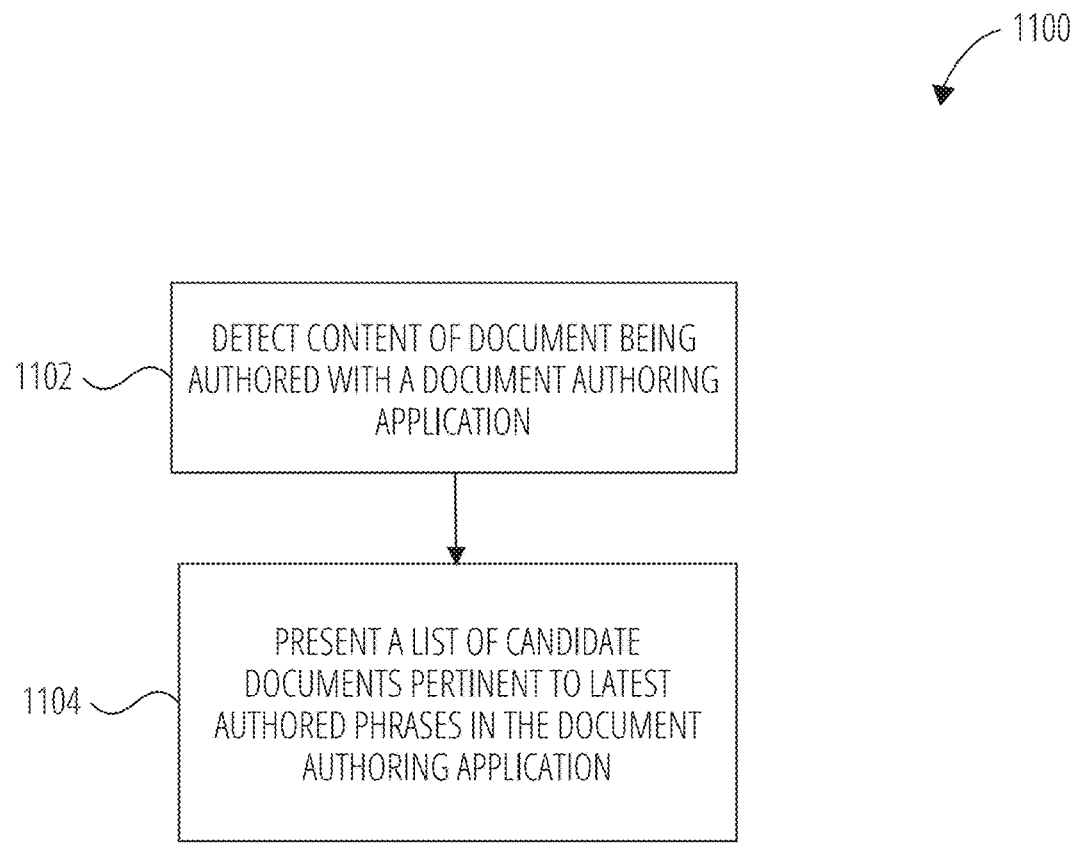
FIG. 11 is a flow diagram illustrating a method for presenting a list of candidate documents in accordance with one example embodiment.

FIG. 11 is a flow diagram illustrating a method 1100 for presenting a list of candidate documents in accordance with one example embodiment. Operations in the method 1100 may be performed by the content recommendation engine 128, using components (e.g., modules, engines) described above with respect to FIG. 2. Accordingly, the method 1100 is described by way of example with reference to the content recommendation engine 128. However, it shall be appreciated that at least some of the operations of the method 1100 may be deployed on various other hardware configurations or be performed by similar components residing elsewhere. For example, some of the operations may be performed at the collaborative content discovery module 110.

In block 1102, the content recommendation engine 128 detects content of document being authored with the document authoring application 124. In block 1104, the content recommendation engine 128 presents a list of candidate documents pertinent to latest authored phrases in the document authoring application 124.

Figure 12:
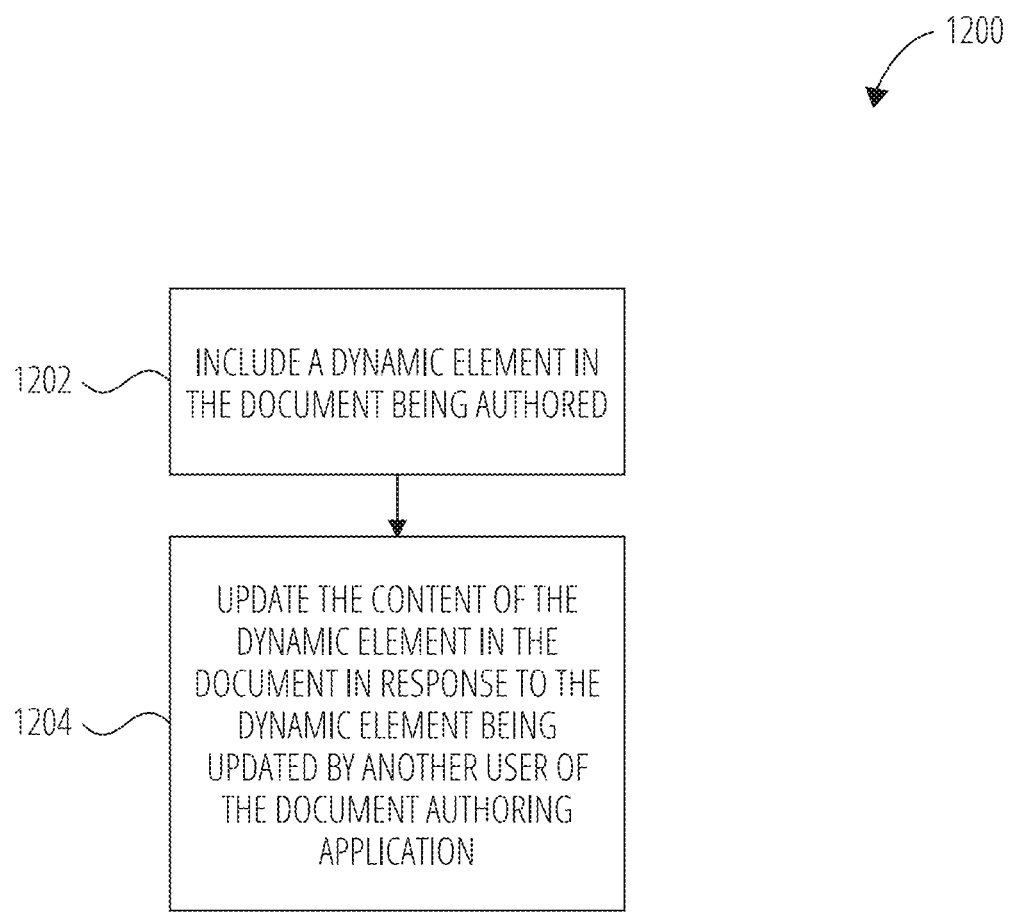
FIG. 12 is a flow diagram illustrating a method for updating content of a dynamic element in real-time in accordance with one example embodiment.

FIG. 12 is a flow diagram illustrating a method 1200 for updating content of a dynamic element in accordance with one example embodiment. Operations in the method 1200 may be performed by the content recommendation engine 128, using components (e.g., modules, engines) described above with respect to FIG. 2. Accordingly, the method 1200 is described by way of example with reference to the content recommendation engine 128. However, it shall be appreciated that at least some of the operations of the method 1200 may be deployed on various other hardware configurations or be performed by similar components residing elsewhere. For example, some of the operations may be performed at the collaborative content discovery module 110.

In block 1202, the content recommendation engine 128 includes a dynamic element in the document being authored. In block 1204, the content recommendation engine 128 updates the content of the dynamic element in the document in response to the dynamic element being updated by another user of the document authoring application 124.

Figure 13:
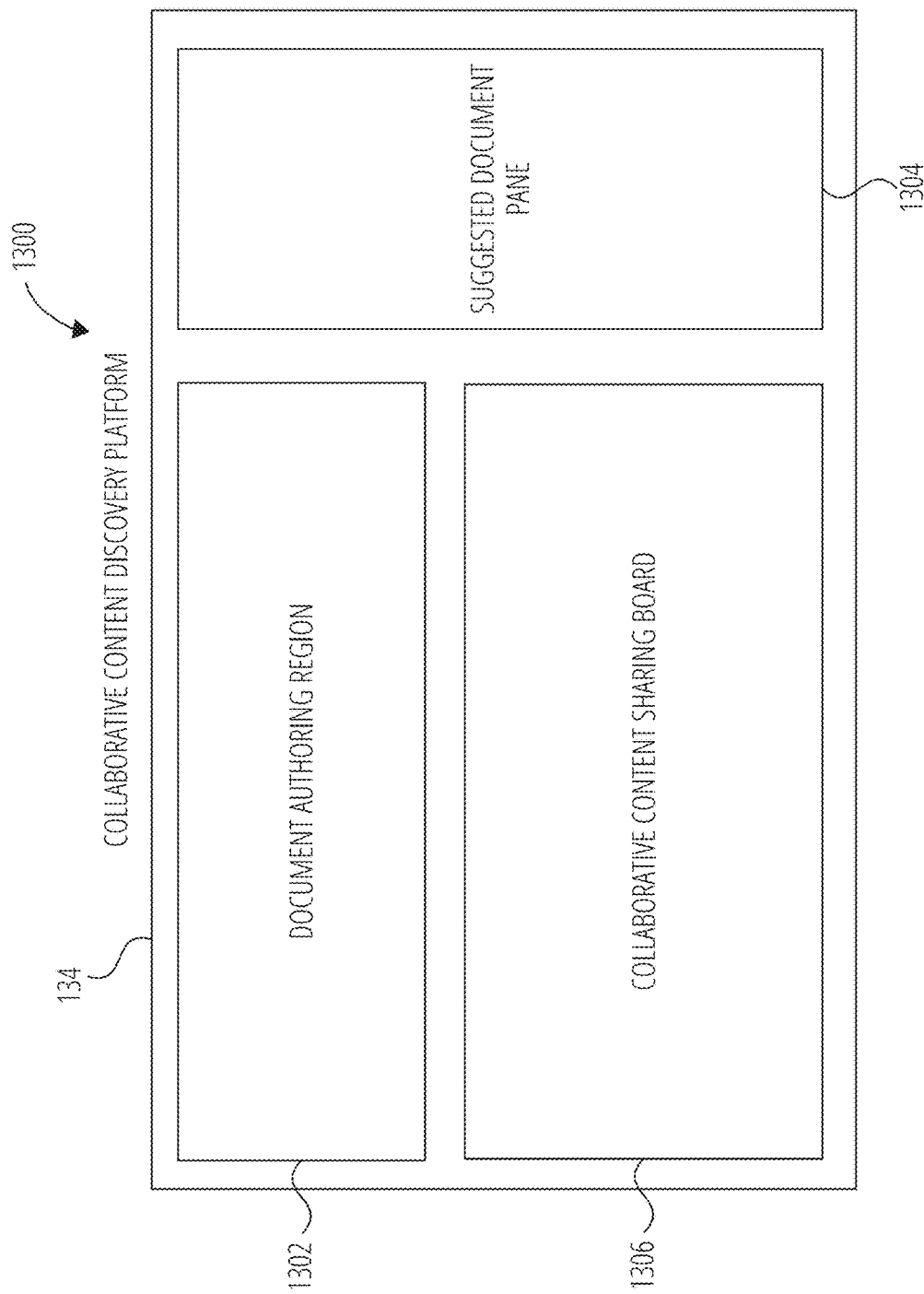
FIG. 13 illustrates an example of a graphical user interface of a collaborative content discovery platform in accordance with one example embodiment.

FIG. 13 illustrates an example of a graphical user interface 1300 in accordance with one example embodiment. The graphical user interface 1300 depicts the document authoring application 124, the document authoring region 1302, the pertinent document pane 1304, and the collaborative content sharing board 1306.

For example, the user 132 operates the document authoring application 124 by editing content in the document authoring region 1302. The content element suggestion module 208 causes a display of the pertinent document pane 1304 based on the content in the document authoring region 1302. The pertinent document pane 1304 includes a pop-up element that is triggered by the content in the document authoring region 1302. The user 132 can then select a suggested content displayed in the pertinent document pane 1304 and then close the pertinent document pane 1304.

The collaborative content sharing board 1306 includes suggested document(s) selected by the user from the pertinent document pane 1304.

Figure 14:
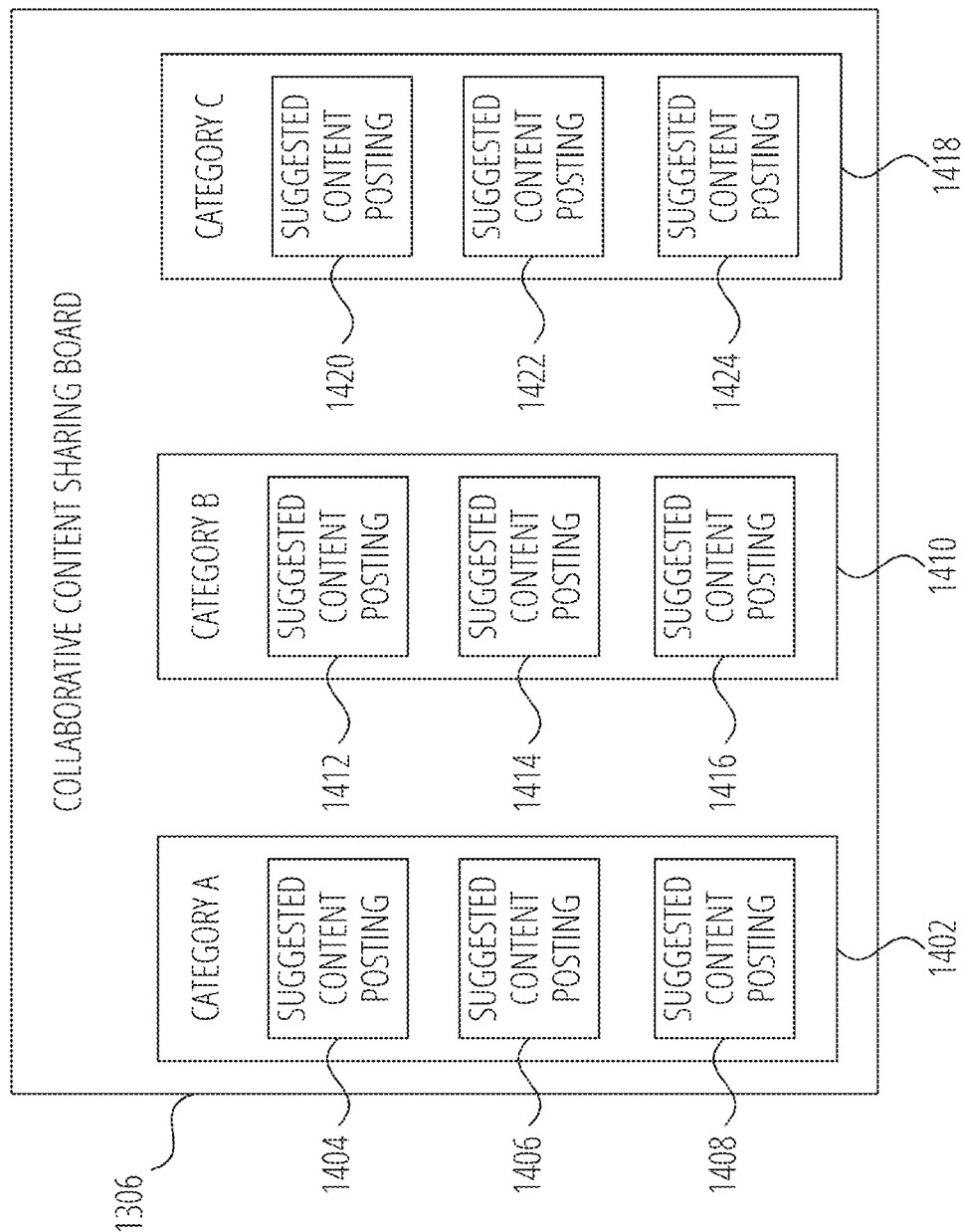
FIG. 14 is an example of a graphical user interface illustrating the collaborative content sharing board in accordance with one embodiment.

FIG. 14 is an example of a graphical user interface illustrating the collaborative content sharing board 1306 in accordance with one example embodiment. The collaborative content sharing board 1306 organizes the posting/dynamic content elements by categories (e.g., category A 1402, category B 1410, category C 1418). Each category includes an ordered list of suggested content posting. For example, category A 1402 includes suggested content posting 1404, suggested content posting 1406, suggested content posting 1408. Category B 1410 includes suggested content posting 1412, suggested content posting 1414, suggested content posting 1416. Category C 1418 includes suggested content posting 1420, suggested content posting 1422, and suggested content posting 1424. The ordered of the suggested content posting within each category is updated and reordered based on the feedback of collaborating users having access to the collaborative content sharing board 1306.

Figure 15:
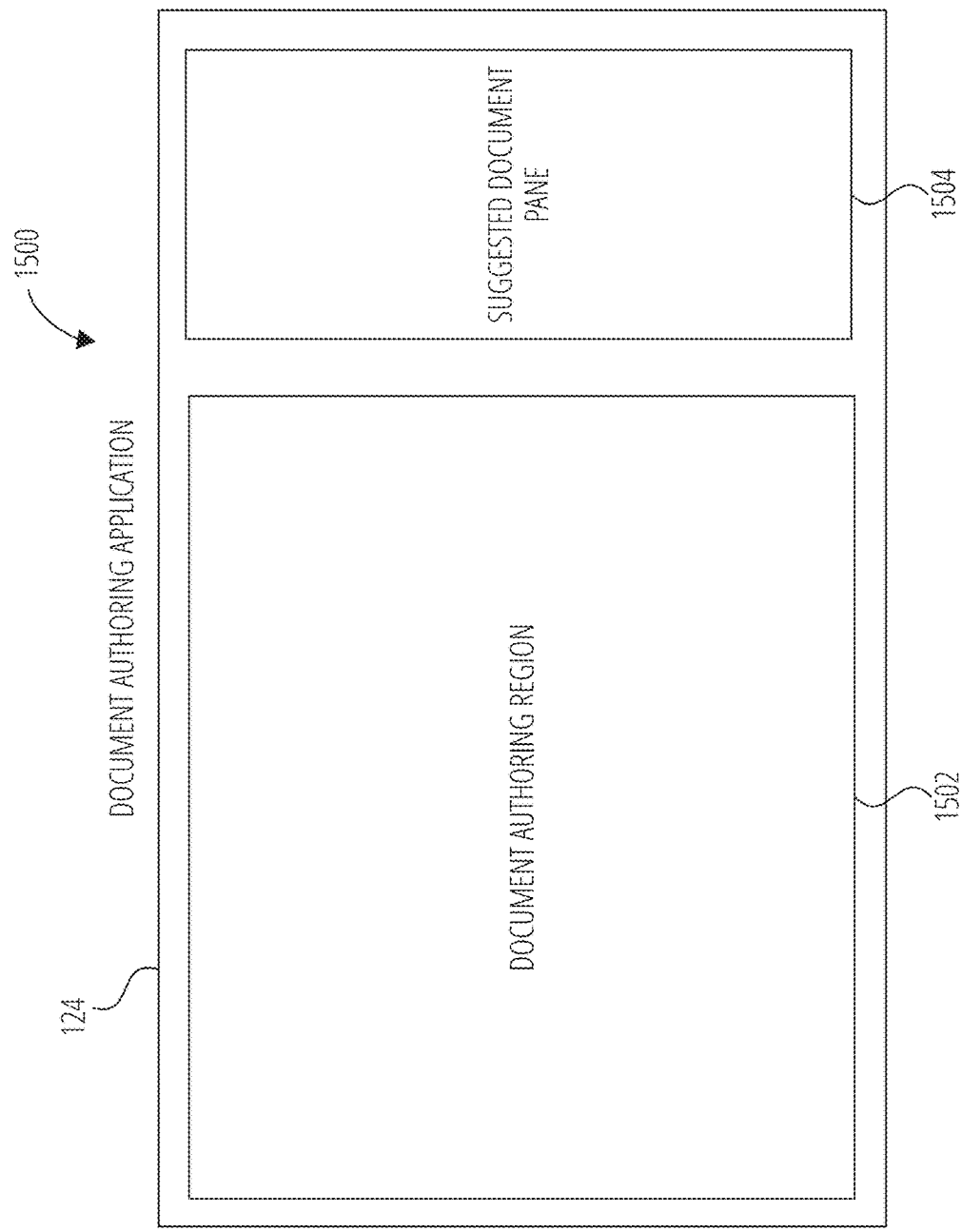
FIG. 15 is an example of a graphical user interface illustrating a document authoring application in accordance with one example embodiment.

FIG. 15 illustrates an example of a graphical user interface 1500 in accordance with one example embodiment. The graphical user interface 1500 depicts the document authoring application 124, the document authoring region 1502, the pertinent document pane 1504. For example, the user 132 operates the document authoring application 124 by editing content in the document authoring region 1502. The content element suggestion module 208 causes a display of the pertinent document pane 1504 based on the content in the document authoring region 1502. The pertinent document pane 1504 includes a pop-up element that is triggered by the content in the document authoring region 1502. The user 132 can then select a suggested content displayed in the pertinent document pane 1504 and then close the pertinent document pane 1504.

Figure 16:
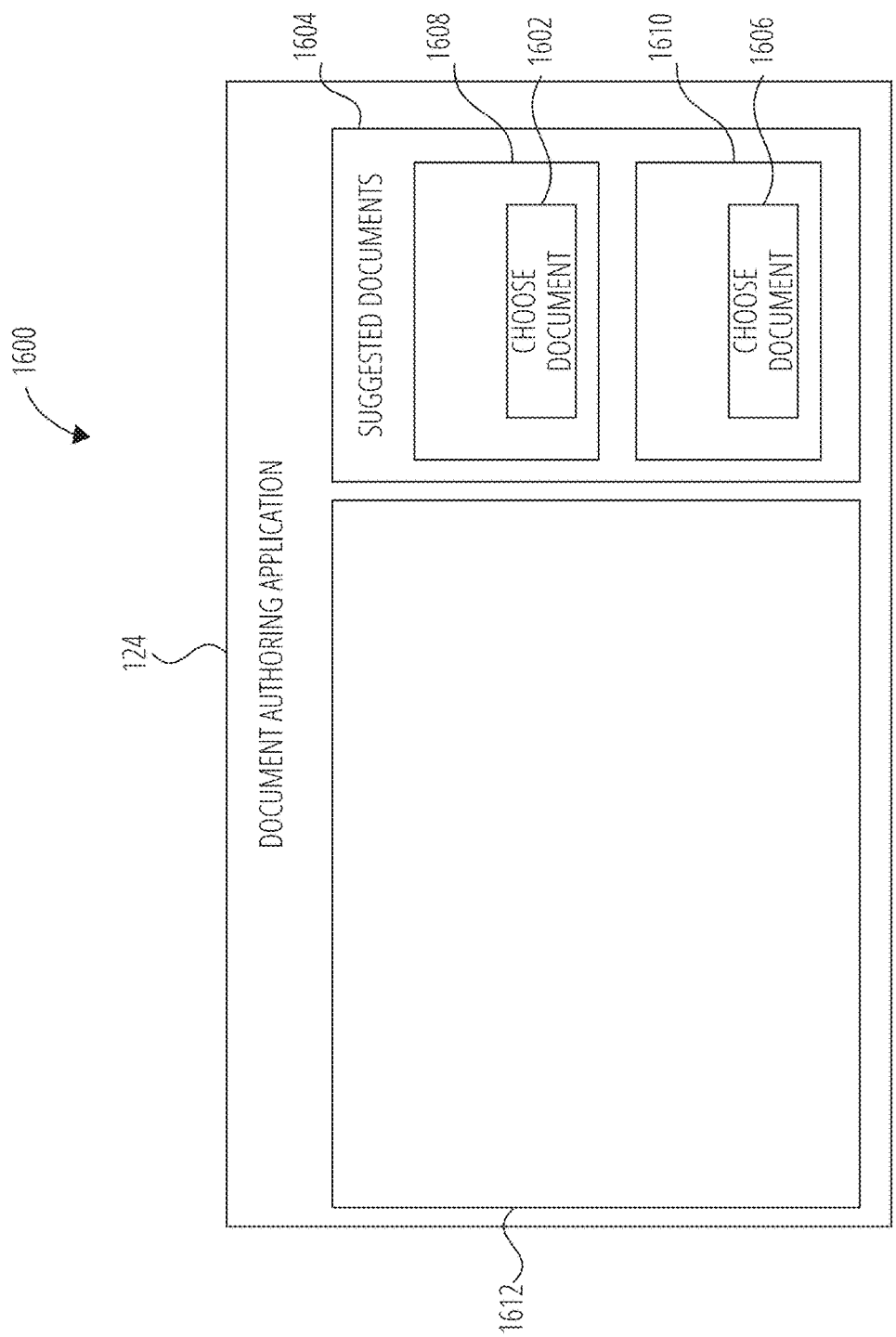
FIG. 16 is an example of a graphical user interface illustrating a document authoring application in accordance with one example embodiment.

FIG. 16 illustrates an example of a graphical user interface 1600 in accordance with one example embodiment. The graphical user interface 1600 depicts a screenshot of a user interface of the document authoring application 124. The graphical user interface 1600 includes a document authoring region 1612 and suggested document pane 1604. The user 132 edits a current document in the document authoring region 1612. The suggested document pane 1604 shows top candidate documents (e.g., candidate document 1608, candidate document 1610) as provided by the ranking module 302. The user can select to include a candidate document in the document authoring region 1612 by clicking on the corresponding "choose document" button (e.g., button 1602 for candidate document 1608, and button 1606 for candidate document 1610).

Figure 17:
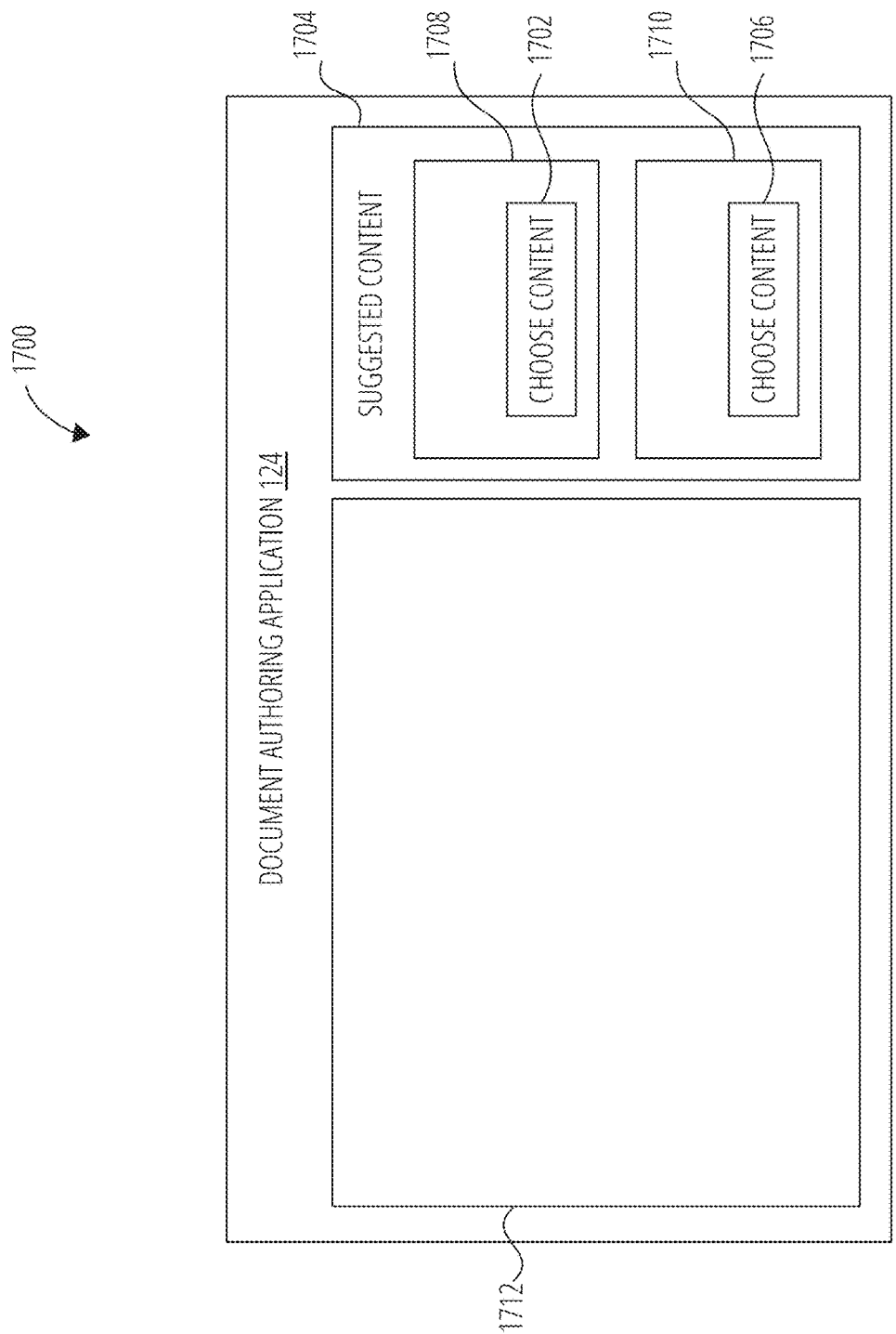
FIG. 17 is an example of a graphical user interface illustrating a document authoring application in accordance with one example embodiment.

FIG. 17 illustrates an example of a graphical user interface 1700 in accordance with one example embodiment. The graphical user interface 1700 depicts a screenshot of a user interface of the document authoring application 124. The graphical user interface 1700 includes a document authoring region 1712 and suggested document pane 1704. The user 132 edits a current document in the document authoring region 1712. The suggested document pane 1704 shows top candidate content (e.g., candidate element 1708, candidate element 1710) as provided by the ranking module 302. The user can select to include a candidate document in the document authoring region 1712 by clicking on the corresponding "choose content" button (e.g., button 1702 for candidate element 1708, and 1706 for candidate element 1710).

Figure 18:
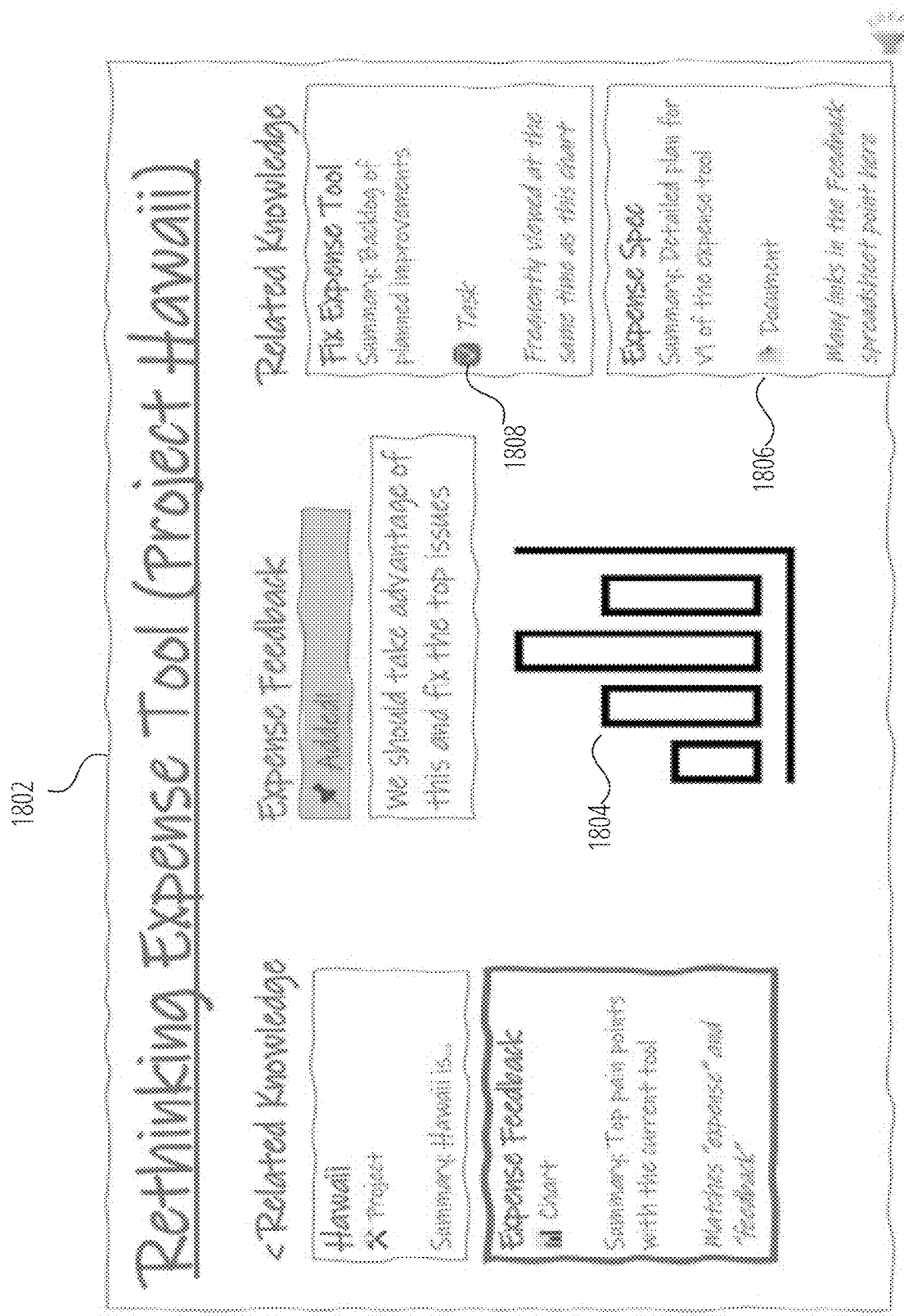
FIG. 18 illustrates an example graphical user interface of the collaborative content discovery platform in accordance with one example embodiment.

FIG. 18 illustrates an example graphical user interface 1802 of the collaborative content discovery platform 134 in accordance with one example embodiment. The graphical user interface 1802 includes dynamic components (e.g., dynamic component 1804, dynamic component 1806, dynamic component 1808) from other applications. These dynamic components are updated in real-time when the respective components are updated by other collaborators.

Figure 19:
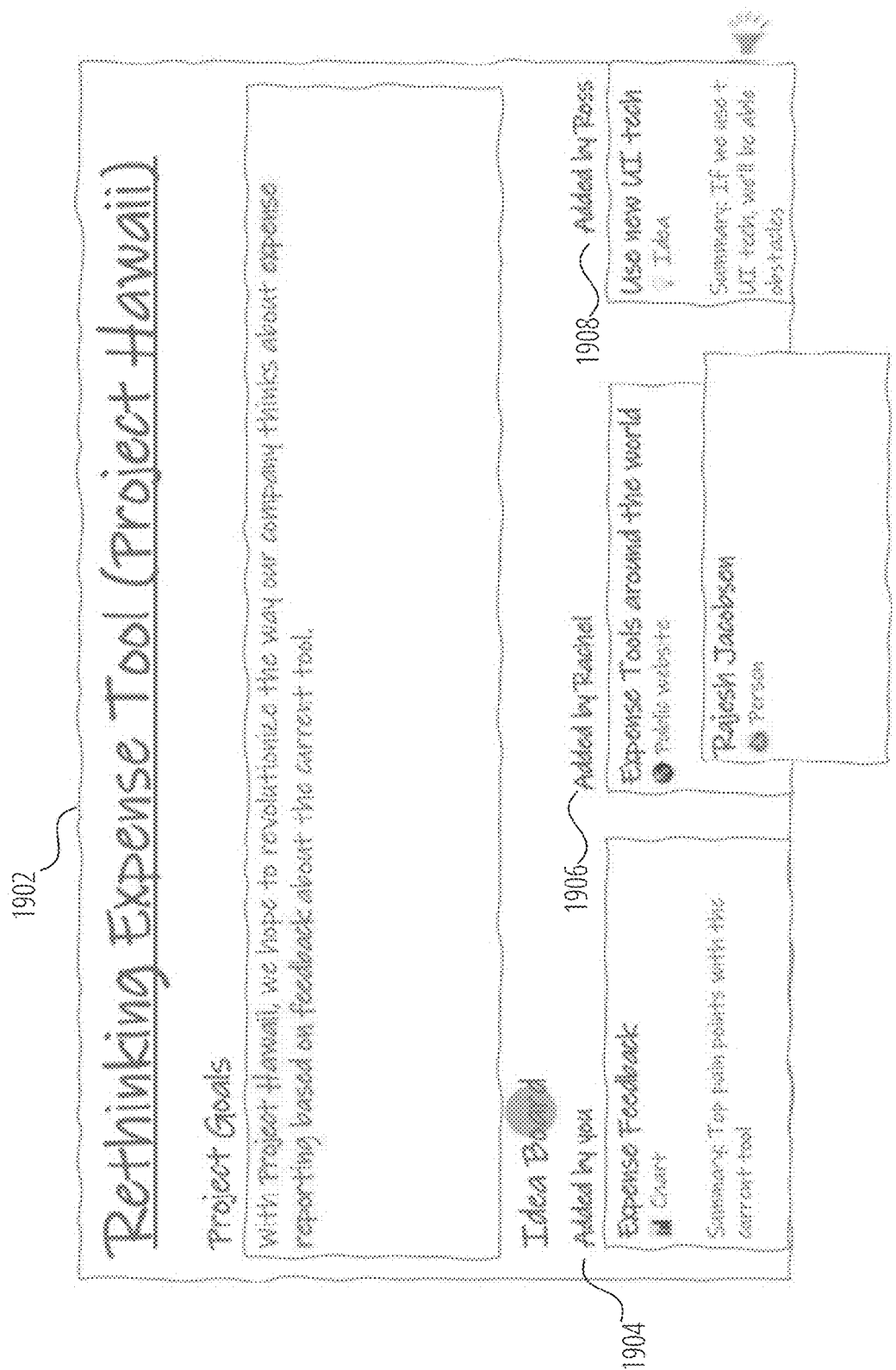
FIG. 19 illustrates an example graphical user interface of the collaborative content discovery platform in accordance with one example embodiment.

FIG. 19 illustrates an example graphical user interface 1902 of the collaborative content discovery platform 134 in accordance with one example embodiment. The graphical user interface 1902 illustrates individual idea boards (e.g., user idea board 1904, user idea board 1906, user idea board 1908) added by respective users.

Figure 20:
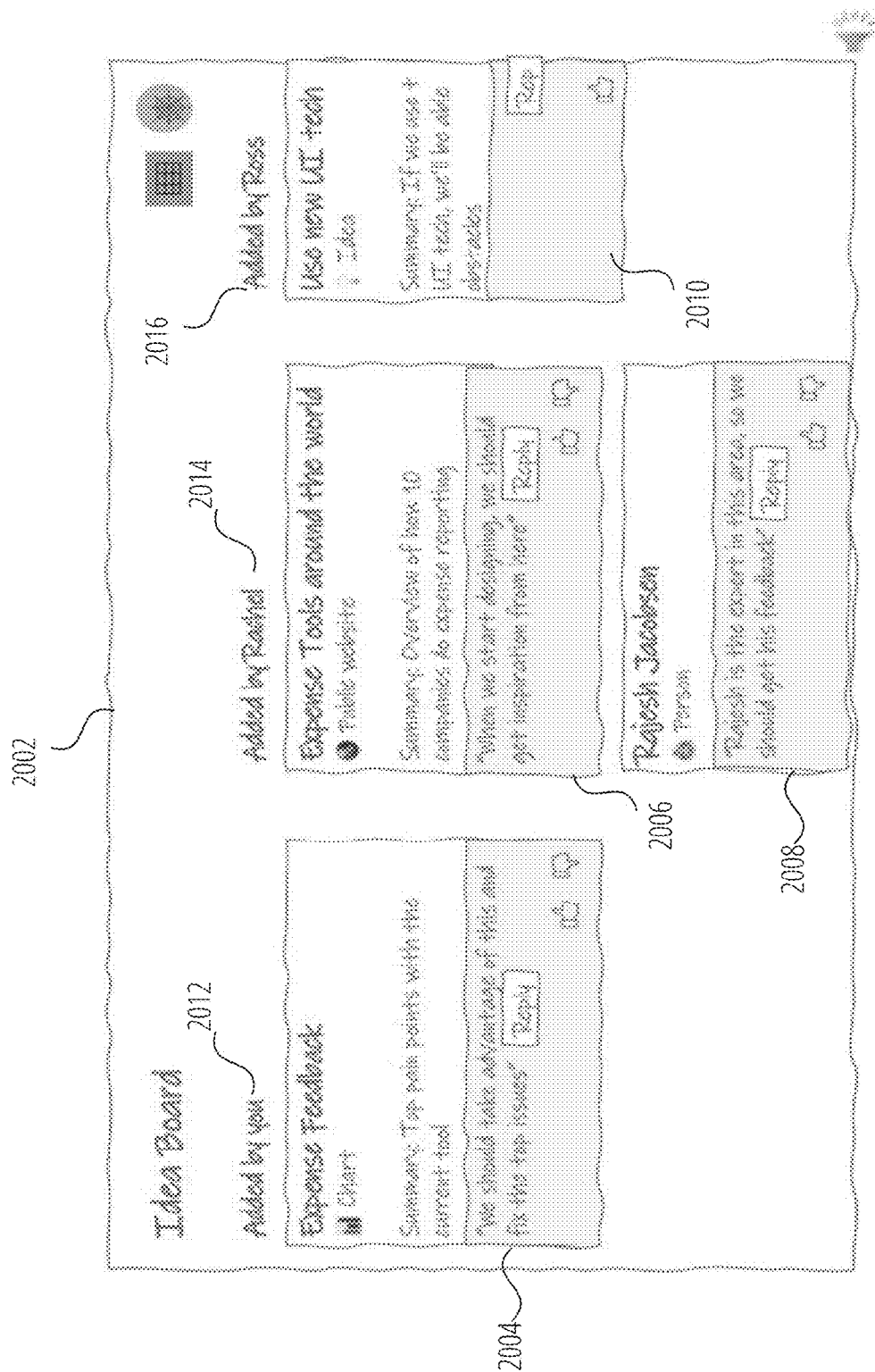
FIG. 20 illustrates an example graphical user interface of the collaborative content discovery platform in accordance with one example embodiment.

FIG. 20 illustrates an example graphical user interface 2002 of the collaborative content discovery platform 134 in accordance with one example embodiment. The graphical user interface 2002 illustrates comments (e.g., comments 2004, comments 2006, comments 2008, and comments 2010) for content component produced by a corresponding user (e.g., user 2012, user 2014, user 2016).

Figure 21:
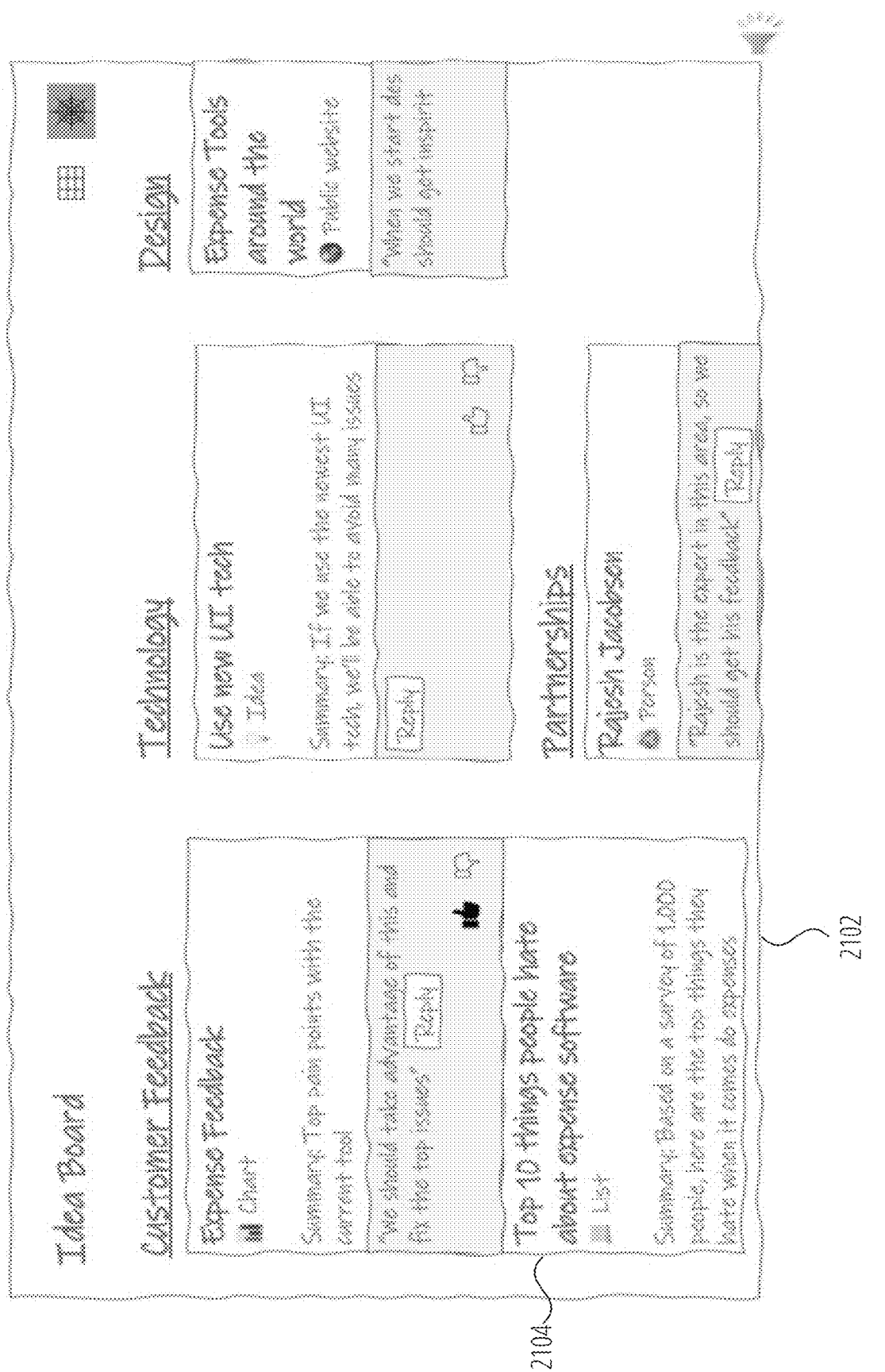
FIG. 21 illustrates an example graphical user interface of the collaborative content discovery platform in accordance with one example embodiment.

FIG. 21 illustrates an example graphical user interface 2102 of the collaborative content discovery platform 134 in accordance with one example embodiment. The graphical user interface 2102 illustrates surfaced component 2104 based on the collective feedback of users (e.g., via up voting, down voting, appending content to a topic).

Figure 22:
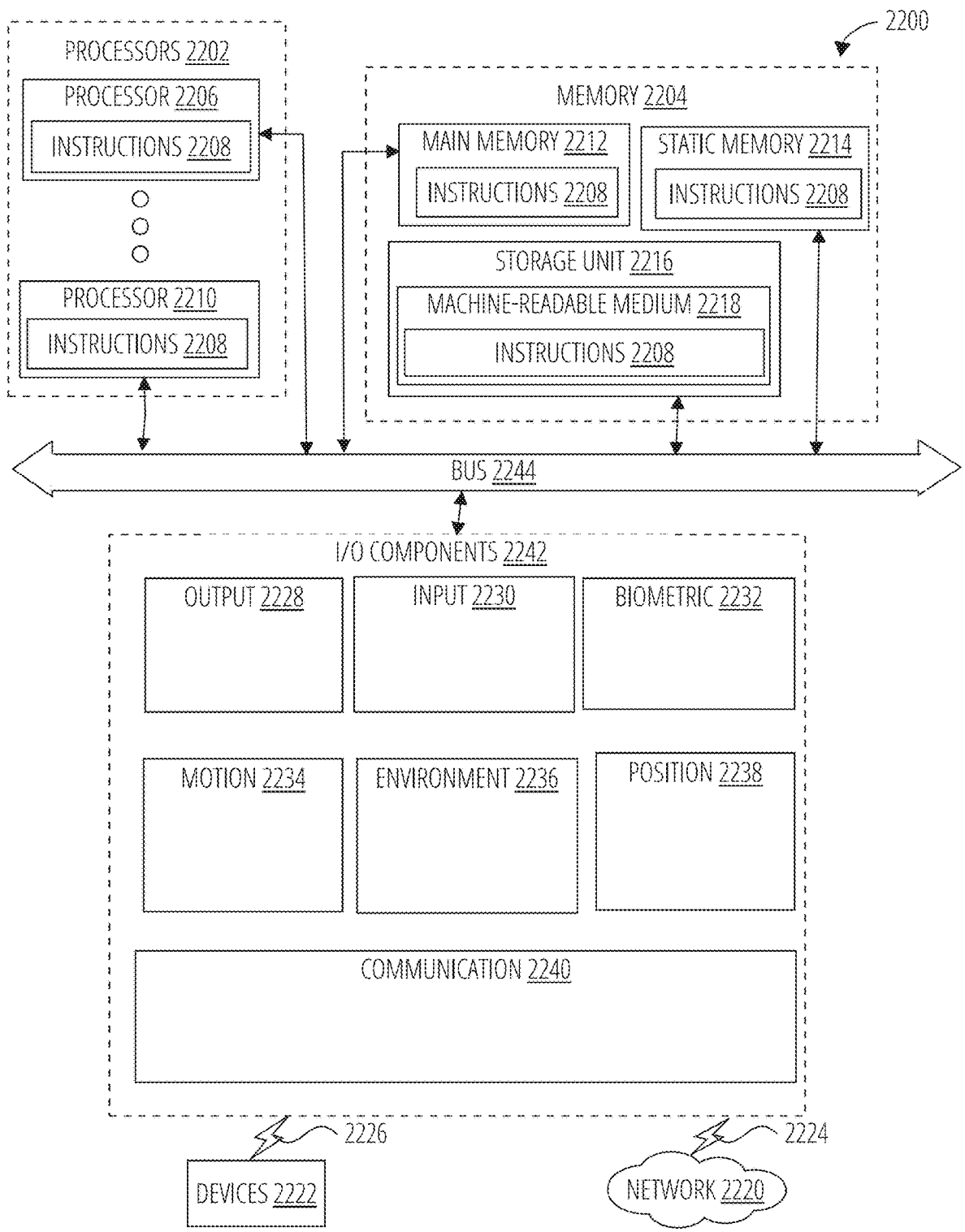
FIG. 22 is a diagrammatic representation of a machine in the form of a computer system within which a set of instructions may be executed for causing the machine to perform any one or more of the methodologies discussed herein, according to an example embodiment.

FIG. 22 is a diagrammatic representation of the machine 2200 within which instructions 2208 (e.g., software, a program, an application, an applet, an app, or other executable code) for causing the machine 2200 to perform any one or more of the methodologies discussed herein may be executed. For example, the instructions 2208 may cause the machine 2200 to execute any one or more of the methods described herein. The instructions 2208 transform the general, non-programmed machine 2200 into a particular machine 2200 programmed to carry out the described and illustrated functions in the manner described. The machine 2200 may operate as a standalone device or may be coupled (e.g., networked) to other machines. In a networked deployment, the machine 2200 may operate in the capacity of a server machine or a client machine in a server-client network environment, or as a peer machine in a peer-to-peer (or distributed) network environment. The machine 2200 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 2208, sequentially or otherwise, that specify actions to be taken by the machine 2200. Further, while only a single machine 2200 is illustrated, the term "machine" shall also be taken to include a collection of machines that individually or jointly execute the instructions 2208 to perform any one or more of the methodologies discussed herein.

The machine 2200 may include processors 2202, memory 2204, and I/O components 2242, which may be configured to communicate with each other via a bus 2244. In an example embodiment, the processors 2202 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 2206 and a processor 2210 that execute the instructions 2208. The term "processor" is intended to include multi-core processors that may comprise two or more independent processors (sometimes referred to as "cores") that may execute instructions contemporaneously. Although FIG. 22 shows multiple processors 2202, the machine 2200 may include a single processor with a single core, a single processor with multiple cores (e.g., a multi-core processor), multiple processors with a single core, multiple processors with multiples cores, or any combination thereof.

The memory 2204 includes a main memory 2212, a static memory 2214, and a storage unit 2216, both accessible to the processors 2202 via the bus 2244. The main memory 2204, the static memory 2214, and storage unit 2216 store the instructions 2208 embodying any one or more of the methodologies or functions described herein. The instructions 2208 may also reside, completely or partially, within the main memory 2212, within the static memory 2214, within machine-readable medium 2218 within the storage unit 2216, within at least one of the processors 2202 (e.g., within the processor's cache memory), or any suitable combination thereof, during execution thereof by the machine 2200.

The I/O components 2242 may include a wide variety of components to receive input, provide output, produce output, transmit information, exchange information, capture measurements, and so on. The specific I/O components 2242 that are included in a particular machine will depend on the type of machine. For example, portable machines such as mobile phones may include a touch input device or other such input mechanisms, while a headless server machine will likely not include such a touch input device. It will be appreciated that the I/O components 2242 may include many other components that are not shown in FIG. 22. In various example embodiments, the I/O components 2242 may include output components 2228 and input components 2230. The output components 2228 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 2230 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 2242 may include biometric components 2232, motion components 2234, environmental components 2236, or position components 2238, among a wide array of other components. For example, the biometric components 2232 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like.

The motion components 2234 include acceleration sensor components (e.g., accelerometer), gravitation sensor components, rotation sensor components (e.g., gyroscope), and so forth. The environmental components 2236 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 2238 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 2242 further include communication components 2240 operable to couple the machine 2200 to a network 2220 or devices 2222 via a coupling 2224 and a coupling 2226, respectively. For example, the communication components 2240 may include a network interface component or another suitable device to interface with the network 2220. In further examples, the communication components 2240 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 2222 may be another machine or any of a wide variety of peripheral devices (e.g., a peripheral device coupled via a USB).

Moreover, the communication components 2240 may detect identifiers or include components operable to detect identifiers. For example, the communication components 2240 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 2240, such as location via Internet Protocol (IP) geolocation, location via Wi-Fi® signal triangulation, location via detecting an NFC beacon signal that may indicate a particular location, and so forth.

The various memories (e.g., memory 2204, main memory 2212, static memory 2214, and/or memory of the processors 2202) and/or storage unit 2216 may store one or more sets of instructions and data structures (e.g., software) embodying or used by any one or more of the methodologies or functions described herein. These instructions (e.g., the instructions 2208), when executed by processors 2202, cause various operations to implement the disclosed embodiments.

The instructions 2208 may be transmitted or received over the network 2220, using a transmission medium, via a network interface device (e.g., a network interface component included in the communication components 2240) and using any one of a number of well-known transfer protocols (e.g., hypertext transfer protocol (HTTP)). Similarly, the instructions 2208 may be transmitted or received using a transmission medium via the coupling 2226 (e.g., a peer-to-peer coupling) to the devices 2222.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

Examples

Example 1 is a computer-implemented method comprising: performing an analysis of text of a document being authored by a user with a document authoring application; searching a document library for content elements and documents based on the analysis of the text; identifying candidate documents and candidate content based on the searching; presenting a list of candidate documents or candidate content with the document authoring application; receiving a selection of a candidate document or candidate content from the list in the document authoring application; and providing the selected candidate document to a collaborative content sharing platform, the collaborative content sharing platform configured to generate a graphical user interface that displays a list of shared documents, the shared documents comprising candidate documents selected by one or more users of a group of users that share access to the collaborative content sharing platform.

Example 2 includes example 1, further comprising: generating a summary of each shared document in the list; and presenting the summary of each shared document in the graphical user interface of the collaborative content sharing platform.

Example 3 includes example 1, further comprising: receiving a feedback for a shared document in the list from one or more users of the group, the feedback indicating an up-vote or a down-vote of the candidate document; adjusting a ranking of the shared document in the list based on the feedback; and adjusting an order of the shared documents in the list based on corresponding ranking.

Example 4 includes example 1, wherein the graphical user interface indicates a plurality of sub-lists categorized by a type of document or by user sharing a suggested content.

Example 5 includes example 1, further comprising: generating a suggestion indicator in a graphical user interface generated by the document authoring application in response to identifying the candidate documents and candidate content based on the searching; detecting a selection of the suggestion indicator by the user of the document authoring application; and presenting a list of candidate documents or candidate content in response to detecting the selection.

Example 6 includes example 1, wherein performing the analysis of text of the document comprises: identifying the last predefined number of words or phrases authored in the document by the user; and analyzing the last predefined number of words or phrases as the document is being authored by the user.

Example 7 includes example 1, wherein the candidate content comprises a dynamic element that is updated near real-time based on changes to the dynamic element by other users having access to the dynamic element.

Example 8 includes example 1, further comprising: identifying a user profile of a user operating the document authoring application; and training a machine learning model based on the user profile and the pattern of events from the document authoring application.

Example 9 includes example 8, wherein the user profile of the user indicates an enterprise profile of the user, collaborators of the user, a group within an enterprise to which the user belongs, an operating system of the client device, and a time and day of the document authoring application activities of the user.

Example 10 includes example 1, further comprising: training a machine learning model based on the pattern of events from the document authoring application.

Example 11 includes example 10, wherein the pattern of events comprises: features values of the document present in the document authoring application; feature values of the first candidate document selected by the user; and feature values of a second candidate document not selected by the user.

Example 12 includes example 1, further comprising: computing the relevance score for each candidate document in the document library based on the machine learning model, the relevance score for each candidate document being indicative of a relevance of each candidate document to the document present in the document authoring application.

Example 13 includes example 12, further comprising: ranking each candidate document based on their corresponding relevance score; and identifying top candidate documents from the ranked candidate documents, the set of candidate documents including the top candidate documents.

Example 14 includes example 1, further comprising: identifying relevant content from the set of candidate documents, the relevant content being pertinent to the content in the document present in the document authoring application, wherein providing the set of candidate documents in the user interface element of the document authoring application further comprises; identifying the relevant content from the set of candidate documents in the user interface element of the document authoring application.

Example 15 includes example 1, wherein the document library includes documents authored, read, edited, and shared by the user of the document authoring application, and documents shared to or from the user.

Example 16 includes example 1, wherein the relevance score is based on a current document feature inputs and candidate document feature inputs, the user document feature inputs comprising a filename, a title, and a preset character neighborhood around an insertion point in the document present in the document authoring application, and the candidate document feature inputs comprising a filename, a title, and a summary of a corresponding candidate document.

Example 17 includes example 1, further comprising: causing a display of a first user interface element of the document authoring application adjacent to a second user interface element of the document authoring application in response to receiving the request, the first user interface element comprising the document being formed by the document authoring application, the second user interface element comprising one or more candidate documents from the set of candidate documents.

Example 18 includes a computing apparatus comprising: a processor; and a memory storing instructions that, when executed by the processor, configure the apparatus to: perform an analysis of text of a document being authored by a user with a document authoring application; search a document library for content elements and documents based on the analysis of the text; identify candidate documents and candidate content based on the searching; present a list of candidate documents or candidate content with the document authoring application; receive a selection of a candidate document or candidate content from the list in the document authoring application; and provide the selected candidate document to a collaborative content sharing platform, the collaborative content sharing platform configured to generate a graphical user interface that displays a list of shared documents, the shared documents comprising candidate documents selected by one or more users of a group of users that share access to the collaborative content sharing platform.

Example 19 includes example 18, wherein the candidate content comprises a dynamic element that is updated near real-time based on changes to the dynamic element by other users having access to the dynamic element.

Example 20 is a non-transitory computer-readable storage medium, the computer-readable storage medium including instructions that when executed by a computer, cause the computer to: perform an analysis of text of a document being authored by a user with a document authoring application; search a document library for content elements and documents based on the analysis of the text; identify candidate documents and candidate content based on the searching; present a list of candidate documents or candidate content with the document authoring application; receive a selection of a candidate document or candidate content from the list in the document authoring application; and provide the selected candidate document to a collaborative content sharing platform, the collaborative content sharing platform configured to generate a graphical user interface that displays a list of shared documents, the shared documents comprising candidate documents selected by one or more users of a group of users that share access to the collaborative content sharing platform.

What is claimed is:

1. A computer-implemented method comprising:
performing an analysis of text of a document presented in a document authoring application;
searching a document library for content elements based on the analysis of the text;
identifying a set of candidate content based on the searching;
presenting the set of candidate content with the document authoring application;
detecting a selected candidate content from the set of candidate content presented with the document authoring application; and
providing the selected candidate content to a collaborative content sharing platform, the collaborative content sharing platform configured to generate a graphical user interface that displays a list of shared content elements, the list of shared content elements comprising candidate content selected by one or more users that share access to the collaborative content sharing platform.

2. The computer-implemented method of claim 1, wherein the document is authored by a user of the document authoring application.

3. The computer-implemented method of claim 1, wherein a candidate content of the set of candidate content includes a candidate document, wherein the method further comprises:
generating a summary of the candidate document; and
presenting the summary of the candidate document in the graphical user interface of the collaborative content sharing platform.

4. The computer-implemented method of claim 1, further comprising:
receiving a feedback for a shared content element from the list of shared content elements, the feedback indicating an up-vote or a down-vote of the shared content element;
adjusting a ranking of the shared content element in the list of shared content elements based on the feedback; and
adjusting an order of the shared content element in the list of shared content elements based on corresponding ranking.

5. The computer-implemented method of claim 1, further comprising:
generating a suggestion indicator in a graphical user interface of the document authoring application in response to identifying the set of candidate content based on the searching;
detecting a selection of the suggestion indicator by a user of the document authoring application; and
presenting the set of candidate content in response to detecting the selection.

6. The computer-implemented method of claim 1, wherein performing the analysis of text of the document comprises:
identifying last predefined number of words or phrases authored in the document by a user of the document authoring application; and
analyzing the last predefined number of words or phrases as the document is being authored by the user document authoring application.

7. The computer-implemented method of claim 1, wherein the candidate content comprises a dynamic element that is updated near real-time based on changes to the dynamic element by other users having access to the dynamic element.

8. The computer-implemented method of claim 1, further comprising:
identifying a user profile of a user operating the document authoring application; and
training a machine learning model based on the user profile and a pattern of events from the document authoring application,
wherein the user profile of the user indicates an enterprise profile of the user, collaborators of the user, a group within an enterprise to which the user belongs, an operating system of a client device of the user, and a time and day of activities of the document authoring application of the user.

9. The computer-implemented method of claim 8, wherein the pattern of events comprises:
features values of the document present in the document authoring application;
feature values of a first candidate content selected by the user; and
feature values of a second candidate content not selected by the user.

10. The computer-implemented method of claim 1, further comprising:
causing a display of a first user interface element of the document authoring application adjacent to a second user interface element of the document authoring application,
the first user interface element comprising the document being edited with the document authoring application, and
the second user interface element comprising one or more candidate content from the set of candidate content.

11. A computing apparatus comprising:
a processor; and
a memory storing instructions that, when executed by the processor, configure the apparatus to perform operations comprising:
performing an analysis of text of a document presented in a document authoring application;
searching a document library for content elements based on the analysis of the text;
identifying a set of candidate content based on the searching;
presenting the set of candidate content with the document authoring application;
detecting a selected candidate content from the set of candidate content presented with the document authoring application; and
providing the selected candidate content to a collaborative content sharing platform, the collaborative content sharing platform configured to generate a graphical user interface that displays a list of shared content elements, the list of shared content elements comprising candidate content selected by one or more users that share access to the collaborative content sharing platform.

12. The computing apparatus of claim 11, wherein the document is authored by a user of the document authoring application.

13. The computing apparatus of claim 11, wherein a candidate content of the set of candidate content includes a candidate document, wherein the operations further comprise:
  generating a summary of the candidate document; and
  presenting the summary of the candidate document in the graphical user interface of the collaborative content sharing platform.

14. The computing apparatus of claim 11, wherein the operations further comprise:
  receiving a feedback for a shared content element from the list of shared content elements, the feedback indicating an up-vote or a down-vote of the shared content element;
  adjusting a ranking of the shared content element in the list of shared content elements based on the feedback; and
  adjusting an order of the shared content element in the list of shared content elements based on corresponding ranking.

15. The computing apparatus of claim 11, wherein the operations further comprise:
  generating a suggestion indicator in a graphical user interface of the document authoring application in response to identifying the set of candidate content based on the searching;
  detecting a selection of the suggestion indicator by a user of the document authoring application; and
  presenting the set of candidate content in response to detecting the selection.

16. The computing apparatus of claim 11, wherein performing the analysis of text of the document comprises:
  identifying last predefined number of words or phrases authored in the document by a user of the document authoring application; and
  analyzing the last predefined number of words or phrases as the document is being authored by the user document authoring application.

17. The computing apparatus of claim 11, wherein the candidate content comprises a dynamic element that is updated near real-time based on changes to the dynamic element by other users having access to the dynamic element.

18. The computing apparatus of claim 11, wherein the operations further comprise:
  identifying a user profile of a user operating the document authoring application; and
  training a machine learning model based on the user profile and a pattern of events from the document authoring application,
  wherein the user profile of the user indicates an enterprise profile of the user, collaborators of the user, a group within an enterprise to which the user belongs, an operating system of a client device of the user, and a time and day of activities of the document authoring application of the user.

19. The computing apparatus of claim 18, wherein the pattern of events comprises:
  features values of the document present in the document authoring application;
  feature values of a first candidate content selected by the user; and
  feature values of a second candidate content not selected by the user.

20. A non-transitory computer-readable storage medium, the computer-readable storage medium including instructions that when executed by a computer, cause the computer to:
  performing an analysis of text of a document presented in a document authoring application;
  searching a document library for content elements based on the analysis of the text;
  identifying a set of candidate content based on the searching;
  presenting the set of candidate content with the document authoring application;
  detecting a selected candidate content from the set of candidate content presented with the document authoring application; and
  providing the selected candidate content to a collaborative content sharing platform, the collaborative content sharing platform configured to generate a graphical user interface that displays a list of shared content elements, the list of shared content elements comprising candidate content selected by one or more users that share access to the collaborative content sharing platform.

* * * * *